(12) United States Patent
Mosby et al.

(10) Patent No.: US 10,968,525 B2
(45) Date of Patent: *Apr. 6, 2021

(54) DEVICE AND METHOD OF OBTAINING DIOLS AND OTHER CHEMICALS USING DECARBOXYLATION

(71) Applicant: ENLIGHTEN INNOVATIONS INC., Calgary (CA)

(72) Inventors: James Mosby, Salt Lake City, UT (US); Sai Bhavaraju, West Jordan, UT (US)

(73) Assignee: ENLIGHTEN INNOVATIONS INC., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,793

(22) Filed: Apr. 30, 2018

(65) Prior Publication Data

US 2019/0100843 A1    Apr. 4, 2019

Related U.S. Application Data

(63) Continuation of application No. 13/790,744, filed on Mar. 8, 2013, now Pat. No. 9,957,622, which is a
(Continued)

(51) Int. Cl.
C25B 1/04 (2021.01)
C25B 3/29 (2021.01)
(Continued)

(52) U.S. Cl.
CPC .............. *C25B 3/29* (2021.01); *C10G 3/00* (2013.01); *C25B 9/19* (2021.01);
(Continued)

(58) Field of Classification Search
CPC .... C25B 1/04; C25B 9/06; C25B 9/00; C25B 9/10; C25B 1/20; C25B 9/206
(Continued)

(56) References Cited

U.S. PATENT DOCUMENTS 2,760,926 A   8/1956   Kronenthal
2,867,569 A   1/1959   Kronenthal
(Continued)

FOREIGN PATENT DOCUMENTS

CA       2642127        8/2007
CN       101089231 A   12/2007
(Continued)

OTHER PUBLICATIONS

Bond, et al., "Integrated Catalytic Conversion of gamma-Valerolactone of Liquid Alkenes for Transportation Fuels," Science. Feb. 26, 2010), pp. 1110-1114, vol. 327.
(Continued)

*Primary Examiner* — Zulmariam Mendez
(74) *Attorney, Agent, or Firm* — Foley & Lardner LLP

(57) ABSTRACT

A method for converting carboxylic acids (including carboxylic acids derived from biomass) into hydrocarbons. The produced hydrocarbons will generally have at least two oxygen containing substituents (or other substituents). In one example of application, the electrolysis converts alkali salts of carboxylic acids into diols which can then be used as solvents or be dehydrated to produce dienes, which can then be used to produce elastic polymeric materials. This process allows custom synthesis of high value chemicals from renewable feed stocks such as carboxylic acids derived from biomass.

16 Claims, 9 Drawing Sheets

Related U.S. Application Data continuation-in-part of application No. 13/612,192, filed on Sep. 12, 2012, now abandoned, which is a continuation-in-part of application No. 13/092,685, filed on Apr. 22, 2011, now Pat. No. 9,051,656, which is a continuation-in-part of application No. 12/840,913, filed on Jul. 21, 2010, now Pat. No. 8,647,492, which is a continuation-in-part of application No. 12/840,508, filed on Jul. 21, 2010, now Pat. No. 8,506,789, which is a continuation-in-part of application No. 12/840,401, filed on Jul. 21, 2010, now abandoned.

(60) Provisional application No. 61/260,961, filed on Nov. 13, 2009, provisional application No. 61/258,557, filed on Nov. 5, 2009, provisional application No. 61/228,078, filed on Jul. 23, 2009.

(51) Int. Cl.
  *C10G 3/00* (2006.01)
  *C25B 9/19* (2021.01)

(52) U.S. Cl.
  CPC .. *C10G 2300/1011* (2013.01); *C10G 2300/44* (2013.01); *Y02P 30/20* (2015.11)

(58) Field of Classification Search
  USPC .......................................................... 204/242
  See application file for complete search history.

(56) References Cited

U.S. PATENT DOCUMENTS

| | | |
|---|---|---|
| 3,193,479 A | 7/1965 | Baizer |
| 3,249,521 A | 5/1966 | Baizer |
| 3,885,626 A | 5/1975 | Gale et al. |
| 3,896,011 A | 7/1975 | Isoya et al. |
| 3,984,295 A | 10/1976 | Kametani et al. |
| 3,992,471 A | 11/1976 | Priegnitz |
| 3,994,471 A | 11/1976 | Turolla |
| 4,006,065 A | 2/1977 | Meresz et al. |
| 4,093,521 A | 6/1978 | Renton et al. |
| 4,110,191 A | 8/1978 | Specht et al. |
| 4,123,336 A | 10/1978 | Seko et al. |
| 4,182,661 A | 1/1980 | Lynch et al. |
| 4,402,804 A | 9/1983 | Jackson |
| 4,450,059 A | 5/1984 | Eskamani et al. |
| 4,464,236 A | 8/1984 | Noding |
| 5,084,146 A | 1/1992 | Huang |
| 5,290,404 A | 3/1994 | Toomey |
| 5,290,405 A | 3/1994 | Joshi et al. |
| 5,580,430 A | 12/1996 | Balagopal et al. |
| 5,625,059 A | 4/1997 | Sedelmeier et al. |
| 5,633,400 A | 5/1997 | Wagner et al. |
| 5,841,002 A | 11/1998 | Harrison et al. |
| 5,892,107 A | 4/1999 | Farone et al. |
| 6,193,872 B1 | 2/2001 | Reason et al. |
| 6,238,543 B1 | 5/2001 | Law et al. |
| 6,362,380 B1 | 3/2002 | Eicken et al. |
| 6,392,091 B2 | 5/2002 | Lin |
| 7,166,724 B2 | 1/2007 | Hilarius et al. |
| 8,506,789 B2 | 8/2013 | Bhavaraju et al. |
| 8,647,492 B2 | 2/2014 | Karanjikar et al. |
| 8,821,710 B2 | 9/2014 | Bhavaraju et al. |
| 8,853,463 B2 | 10/2014 | Karanjikar et al. |
| 2001/0019020 A1 | 9/2001 | Merk et al. |
| 2002/0015883 A1 | 2/2002 | Hilarius et al. |
| 2003/0024879 A1 | 2/2003 | Carson et al. |
| 2004/0035715 A1 | 2/2004 | Putter et al. |
| 2004/0124094 A1 | 7/2004 | Hakansson et al. |
| 2005/0126926 A1 | 6/2005 | Ogihara et al. |
| 2005/0177008 A1 | 8/2005 | Balagopal et al. |
| 2007/0012578 A1 | 1/2007 | Edvinsson Albers et al. |
| 2007/0074975 A1 | 4/2007 | Buschmann et al. |
| 2007/0138020 A1 | 6/2007 | Balagopal et al. |
| 2007/0181437 A1 | 8/2007 | Stapley et al. |
| 2008/0142373 A1 | 6/2008 | Joshi et al. |
| 2008/0177114 A1 | 7/2008 | Goossen et al. |
| 2008/0245671 A1 | 10/2008 | Balagopal et al. |
| 2009/0057162 A1 | 3/2009 | Balagopal et al. |
| 2009/0074611 A1 | 3/2009 | Monzyk et al. |
| 2009/0107850 A1 | 4/2009 | Fang et al. |
| 2009/0305942 A1 | 12/2009 | Day et al. |
| 2010/0044242 A1 | 2/2010 | Bhavaraju et al. |
| 2010/0159553 A1 | 6/2010 | Bradin |
| 2010/0258447 A1 | 10/2010 | Fan |
| 2010/0324310 A1 | 12/2010 | Dumesic et al. |
| 2010/0331170 A1 | 12/2010 | Balagopal et al. |
| 2011/0000782 A1 | 1/2011 | Reddy et al. |
| 2011/0024288 A1 | 2/2011 | Bhavaraju et al. |
| 2011/0027848 A1 | 2/2011 | Karanjikar et al. |
| 2011/0035995 A1 | 2/2011 | Busch |
| 2011/0111475 A1 | 5/2011 | Kuhry et al. |
| 2011/0168569 A1 | 7/2011 | Bhavaraju et al. |
| 2011/0226633 A1 | 9/2011 | Bhavaraju et al. |
| 2011/0240484 A1 | 10/2011 | Pendleton et al. |
| 2012/0031769 A1 | 2/2012 | Bhavaraju et al. |
| 2012/0035403 A1 | 2/2012 | Flytzani-Stephanopoulos et al. |
| 2012/0123168 A1 | 5/2012 | Bhavaraju |
| 2012/0142945 A1 | 6/2012 | Hwang et al. |
| 2012/0316093 A1 | 12/2012 | Zhan et al. |
| 2013/0001095 A1 | 1/2013 | Bhavaraju et al. |
| 2013/0186770 A1 | 7/2013 | Mosby et al. |
| 2013/0284607 A1 | 10/2013 | Bhavaraju et al. |
| 2014/0154766 A1 | 6/2014 | Karanjikar et al. |
| 2015/0361565 A1 | 12/2015 | Mosby et al. |

FOREIGN PATENT DOCUMENTS

| | | |
|---|---|---|
| CN | 101336313 A | 12/2008 |
| EP | 0 838 435 A1 | 4/1998 |
| GB | 0 787 976 A | 12/1957 |
| JP | 06-271499 A | 9/1994 |
| SU | 979325 A1 | 12/1982 |
| WO | WO-2006/077204 A2 | 7/2006 |
| WO | WO-2007/095215 A2 | 8/2007 |
| WO | WO-2011/133906 A2 | 10/2011 |
| WO | WO-2012/103529 A2 | 8/2012 |

OTHER PUBLICATIONS

Bozell, "Connecting Biomass and Petroleum Processing with a Chemical Bridge," Science, Jul. 30, 2010, pp. 522-523, vol. 329.

Choi, et al., "Recovery of lactic acid from sodium lactate by ion substitution using ion-exchange membrane," Separation and Purification Technology, Jul. 2002, pp. 69-79, vol. 28, Issue 1.

Chum, et al., "Photoelectrochemistry of Levulinic Acid on Undoped Platinized n-TI02 Powders," Journal Physical Chemistry, 1983, pp. 3089-3093, vol. 87, No. 16.

Conway, et al., "New Approaches to the Study of Electrochemical Decarboxylation and the Kolbe Reaction. 1. The Model Reaction with Formate," Canadian Journal of Chemistry, 1963, pp. 21-37, vol. 41.

Dzik, et al., "Carboxylates as sources of carbon nucleophiles and electrophiles: comparison of decarboxylative and decarbonylative pathways," Chemical Science, 2012, pp. 2671-2678, vol. 3 Issue 9.

Eberson, L., Studies on the Kolbe Electrolytic Synthesis, Acta Chemica Scandinavica 17 (1963) No. 5 1196-1202.

European Search Report in EP Application No. 118149293 dated Sep. 12, 2016 (11 pages).

European Search Report in EP Application No. 12739864.2 dated Nov. 30, 2015 (9 pages).

European Search Report in EP Application No. 147608889 dated Sep. 12, 2016 (7 pages).

European Search Report in EP Application No. 147608897 dated Sep. 12, 2016 (11 pages).

European Search Report in EP Application No. 147627293 dated Sep. 12, 2016 (11 pages).

Extended European Search Report in EP 11772799.0 dated Aug. 25, 2016 (5 pages).

(56) References Cited

OTHER PUBLICATIONS

Extended European Search Report in EP14760889.7 dated Sep. 20, 2016 (11 pages).
Final Rejection Office Action in U.S Appl. No. 12/840,401 dated Mar. 13, 2014 (23 pages).
Final Rejection Office Action in U.S Appl. No. 12/840,401 dated Mar. 15, 2013 (12 pages).
Final Rejection Office Action in U.S Appl. No. 12/840,401 dated Apr. 3, 2015 (20 pages).
Final Rejection Office Action in U.S Appl. No. 12/840,508 dated Nov. 27, 2012 (25 pages).
Final Rejection Office Action in U.S Appl. No. 12/840,913 dated Jul. 18, 2013 (16 pages).
Final Rejection Office Action in U.S Appl. No. 12/840,913 dated Aug. 14, 2012 (28 pages).
Final Rejection Office Action in U.S Appl. No. 13/103,716 dated Nov. 20, 2014 (15 pages).
Final Rejection Office Action in U.S Appl. No. 13/357,463 dated Jan. 3, 2014 (14 pages).
Final Rejection Office Action in U.S Appl. No. 13/357,463 dated Sep. 6, 2013 (16 pages).
Final Rejection Office Action in U.S Appl. No. 13/357,463 dated Sep. 19, 2012 (17 pages).
Final Rejection Office Action in U.S Appl. No. 13/612,192 dated Apr. 14, 2015 (12 pages).
Final Rejection Office Action in U.S Appl. No. 13/612,192 dated Aug. 15, 2014 (18 pages).
Final Rejection Office Action in U.S Appl. No. 13/790,744 dated Jul. 9, 2015 (15 pages).
Final Rejection Office Action in U.S Appl. No. 13/790,744 dated Aug. 9, 2016 (18 pages).
Final Rejection Office Action in U.S Appl. No. 13/834,569 dated Feb. 23, 2016 (17 pages).
Final Rejection Office Action in U.S Appl. No. 13/930,211 dated Nov. 21, 2014 (32 pages).
Final Rejection Office Action in U.S Appl. No. 14/098,000 dated Feb. 28, 2017 (19 pages).
Final Rejection Office Action in U.S Appl. No. 14/098,000 dated Jun. 6, 2016 (34 pages).
Final Rejection Office Action in U.S Appl. No. 14/198,026 dated Apr. 3, 2015 (11 pages).
Final Rejection Office Action in U.S Appl. No. 14/206,981 dated Feb. 25, 2016 (20 pages).
Final Rejection Office Action in U.S Appl. No. 14/322,037 dated Dec. 18, 2015 (21 pages).
Final Rejection Office Action in U.S Appl. No. 14/322,037 dated May 9, 2017 (18 pages).
Final Rejection Office Action in U.S Appl. No. 14/322,037 dated Jul. 25, 2016 (21 pages).
Final Rejection Office Action in U.S Appl. No. 14/469,878 dated Nov. 3, 2016 (7 pages).
Final Rejection Office Action on U.S Appl. No. 15/290,864 dated Mar. 12, 2018 (15 pages).
First Office Action in JP Application No. 2013-550666 dated Aug. 25, 2015 (13 pages).
Glasstone, et al., "Studies in Electrolysis Oxydation Part V11. The Electrolysis of Acetates in Non-Aqueous Solutions," J. Chem. Soc., Jan. 1, 1936, pp. 820-827.
Habova, et al., "Application of Electrodialysis for Lactic Acid Recovery," Czech J. Food Sci., 2001, pp. 73-80, vol. 19, No. 2.
Haufe, et al., "Bifunktionelle Verbindungen durch Kolbe-Elecktolyse," Chemie-Ing. Techn., 1970, pp. 170-175, vol. 42, No. 4.
Hibino, et al., "Oxidative Coupling of CH4 using Alkali-Metal Ion Conductors as a Solid Electrolyte," J. Chem. Soc., 1996, pp. 2393-2396, vol. 92, No. 13.
Huang, et al., "Application of electrodialysis to the production of organic acids: State-of-the-art and recent developments," Journal of Membrane Science, Feb. 2007, pp. 1-12, vol. 288, Issues 1-2.

International Search Report and Written Opinion in International Application No. PCT/US2010/042715 dated Apr. 29, 2011 (7 pages).
International Search Report and Written Opinion in International Application No. PCT/US2010/042756 dated Feb. 28, 2011 (7 pages).
International Search Report and Written Opinion in International Application No. PCT/US2010/042780 dated May 2, 2011 (7 pages).
International Search Report and Written Opinion in International Application No. PCT/US2010/042780 dated May 2, 2011 (8 pages).
International Search Report and Written Opinion in International Application No. PCT/US2011/033626 dated Feb. 8, 2012 (7 pages).
International Search Report and Written Opinion in International Application No. PCT/US2011/035782 dated Feb. 9, 2012 (7 pages).
International Search Report and Written Opinion in International Application No. PCT/US2014/020786 dated Jun. 26, 2014 (6 pages).
International Search Report and Written Opinion in International Application No. PCT/US2014/021927 dated Jul. 10, 2014 (10 pages).
International Search Report and Written Opinion in International Application No. PCT/US2014/028842 dated Aug. 14, 2014 (10 pages).
International Search Report and Written Opinion in PCT/US2011/033636 dated Feb. 8, 2012 (7 pages).
Klocke, et al., "Influences on the Selectivity of the Kolbe versus the Non-Kolbe Electrolyis in the Anodic Decarboxylation of Carboxylic Acids," Electroorganic Sythesis, Nov. 2, 1992, pp. 1-8.
Kobzeva, et al., "Effect of a solvent on anode processes," Elektrokhimiya, 1975, 1 pages abstract, vol. 11, No. 5.
Li, "Organic Synthesis using Kolbe reaction," Ghangzhou Chemical Industry, Dec. 30, 1992, pp. 18-21, vol. 20 No. 4.
Lu, et al., "Modeling of the mass transfer and conduction behavior in electroelectrodialysis with oil/water emulsion as the catholyte", Journal of Membrane Science, Sep. 2008, pp. 265-274, vol. 322, Issue 1.
Malaysian Search Report in MY Application No. PI 2011004930 dated Feb. 26, 2015.
Minami, et al., "Electrolysis of Fatty Acids II," Kogyo Kaqgku Zasshi, 1950, 1 page abstract, vol. 53.
Moon, et al., "Competitive Anion Transport in Desalting Mixtures of Organic Acids by Batch Electrodialysis," Journal of Membrane Science, Apr. 1998, pp. 75-89, vol. 141, Issue 1.
Non-Final Office Action in CN Application No. 201180007926.8 dated Aug. 18, 2015 (15 pages).
Non-Final Rejection Office Action in U.S Appl. No. 12/840,401 dated Jun. 5, 2012 (12 pages).
Non-Final Rejection Office Action in U.S Appl. No. 12/840,401 dated Jul. 30, 2013 (15 pages).
Non-Final Rejection Office Action in U.S Appl. No. 12/840,508 dated Nov. 2, 2011 (17 pages).
Non-Final Rejection Office Action in U.S Appl. No. 12/840,508 dated Apr. 26, 2012 (32 pages).
Non-Final Rejection Office Action in U.S Appl. No. 12/840,913 dated Nov. 16, 2011 (16 pages).
Non-Final Rejection Office Action in U.S Appl. No. 12/840,913 dated Mar. 28, 2013 (31 pages).
Non-Final Rejection Office Action in U.S Appl. No. 12/840,913 dated Apr. 10, 2012 (12 pages).
Non-Final Rejection Office Action in U.S Appl. No. 13/092,685 dated May 20, 2014 (20 pages).
Non-Final Rejection Office Action in U.S Appl. No. 13/103,716 dated Jun. 24, 2014 (15 pages).
Non-Final Rejection Office Action in U.S Appl. No. 13/357,463 dated Apr. 9, 2013 (21 pages).
Non-Final Rejection Office Action in U.S Appl. No. 13/357,463 dated Jun. 4, 2012 (25 pages).
Non-Final Rejection Office Action in U.S Appl. No. 13/612,192 dated Dec. 10, 2013 (33 pages).
Non-Final Rejection Office Action in U.S Appl. No. 13/612,192 dated Dec. 5, 2014 (37 pages).
Non-Final Rejection Office Action in U.S Appl. No. 13/612,192 dated Apr. 8, 2014 (24 pages).
Non-Final Rejection Office Action in U.S Appl. No. 13/790,744 dated Nov. 4, 2014 (11 pages).

(56) References Cited

OTHER PUBLICATIONS

Non-Final Rejection Office Action in U.S Appl. No. 13/790,744 dated Dec. 28, 2015 (15 pages).
Non-Final Rejection Office Action in U.S Appl. No. 13/790,744 dated Mar. 20, 2014 (22 pages).
Non-Final Rejection Office Action in U.S Appl. No. 13/834,569 dated Jul. 15, 2015 (13 pages).
Non-Final Rejection Office Action in U.S Appl. No. 13/834,569 dated Jul. 22, 2016 (15 pages).
Non-Final Rejection Office Action in U.S Appl. No. 13/930,211 dated Jul. 23, 2014 (43 pages).
Non-Final Rejection Office Action in U.S Appl. No. 14/098,000 dated Oct. 13, 2016 (5 pages).
Non-Final Rejection Office Action in U.S Appl. No. 14/098,000 dated Dec. 29, 2015 (27 pages).
Non-Final Rejection Office Action in U.S Appl. No. 14/198,026 dated Nov. 14, 2014 (20 pages).
Non-Final Rejection Office Action in U.S Appl. No. 14/206,981 dated Oct. 7, 2015 (18 pages).
Non-Final Rejection Office Action in U.S Appl. No. 14/322,037 dated Nov. 23, 2016 (20 pages).
Non-Final Rejection Office Action in U.S Appl. No. 14/322,037 dated Mar. 29, 2016 (17 pages).
Non-Final Rejection Office Action in U.S Appl. No. 14/322,037 dated Sep. 1, 2015 (18 pages).
Non-Final Rejection Office Action in U.S Appl. No. 14/469,878 dated Mar. 3, 2016 (13 pages).
Non-Final Rejection Office Action in U.S Appl. No. 14/704,783 dated Apr. 5, 2017 (16 pages).
Notice of Allowance in JP Application No. 2013-550666 dated Feb. 2, 2016 (4 pages).
Notice of Allowance in KR Application No. 10-2012-7027450 dated Apr. 27, 2017 (without English translation) (3 pages).
Notice of Allowance in U.S. Appl. No. 12/840,508 dated Apr. 29, 2013 (11 pages).
Notice of Allowance in U.S. Appl. No. 12/840,913 dated Oct. 4, 2013 (11 pages).
Notice of Allowance in U.S. Appl. No. 13/092,685 dated Feb. 19, 2015 (18 pages).
Notice of Allowance in U.S. Appl. No. 14/098,000 dated May 10, 2017 (7 pages).
Notice of Allowance in U.S. Appl. No. 14/198,026 dated Aug. 4, 2015 (7 pages).
Notice of Allowance in U.S. Appl. No. 14/206,981 dated Jul. 14, 2016 (10 pages).
Notice of Allowance in U.S. Appl. No. 14/469,878 dated Feb. 15, 2017 (20 pages).
Notice of Preliminary Rejection in KR Application No. 10-2012-707450 dated Oct. 27, 2016 (5 pages).
Obermuller, "Saponification by Sodium Ethoxide," J Chem. Soc . Abstr. 62, 1892, 1 page abstract.
Office Action in CN Application No. 2011800079268 dated Sep. 12, 2014 (12 pages).
Ono, et al., "Electrolysis of fatty acids I," Ind. Chem. Sect. 53, 1950,1 page abstract.
Palaty, et al., "Continuous dialysis of carboxylic acids. Permeability of Neosepta—AMH membrane," Desalination, Oct. 2007, pp. 345-355, vol. 216, Issues 1-3.
Palit, "The Solubility of Soaps and of Same Salts in Mixtures of Solvents, One of Which is of Glycolic Type," Utah Consortia UALC, Dec. 1947, pp. 3120-3129, vol. 69.
Pande, et al., "Studies on Kolbe's Electrosynthesis," Electrochimica Acta, Aug. 1961, pp. 215-231, vol. 4.
Paul, et al., "Reactions of Sodium Metal with Aromatic Hydrocarbons," J. Am. Chem. Soc., Jan. 1956, pp. 116-120, vol. 78, Issue 1.
Prado Rubio, et al., "Modeling Reverse Electro-Enhanced Dialysis for Integration with Lactic Acid Fermentation", CAPEC, Department of Chemical and Biochemical Engineering Technical University of Denmark (DTU}, DK-2800 Lyngby Denmark, 2009, Available as "A-DK-Prado Rubio-OA-1" at Docstoc.com, http://www.docstoc.com/search/modeling%20reverse%20electro-enhanced%20dialysis%20for%20integration%20with%20 1actic%20acid%20fermentation?catid=0,(Jan. 1, 2009), pp. 1-2.
Rabjohn, et al., "Kolbe Electrosynthesis of Alkanes with Multiple Quaternary Carbon Atoms," Journal of Organic Chemistry, 1981, pp. 4082-4083, vol. 46, No. 20.
Schafer, "Recent Contributions of Kolbe Electrolysis to Organic Synthesis", Topics in Current Chemistry, 1990, pp. 91-151, vol. 152.
Sekine, et al., "Effect of the Concentration of Acetate or Propionate on the Abnormal Phenomena in the Kolbe Reaction," Denki Kagaku, 1973, pp. 702-707, vol. 41, Issue 9.
Shafer, "Electrochemical Conversion of Fatty Acids," European Journal of Lipid Science and Technology, Oct. 11, 2011, pp. 2-9, vol. 114, Issue 1.
Sharkey et al., 2,7-Dimethyl-2,7-Dinitro?Ctane, Organic Syntheses, Coll. vol. 5, p. 445 (1973); vol. 41, p. 24 (1961) (5 pages).
U.S. Office Action on 111147-0247 dated Aug. 8, 2017.
Weiper, et al., "Mixed Kolbe Electrolysis with Sugar Carboxylic Acids," Angew. Chem. Int. Ed. Engl., 1990, pp. 195-197, vol. 29, No. 2.
Yi, et al., "An in situ coupling separation process of electro-electrodialysis with back-extraction," Journal of Membrane Science, Jun. 2005, pp. 57-65, vol. 255, Issues 1-2.
Zhuo, et al., Degradation of Perfuluorinated Compounds on a Boron-Doped Diamond Electrode, Electrochimica Acta, Apr. 14, 2012, pp. 17-22, vol. 77.
Examiner's Requisition in CA 2902997 dated Jul. 21, 2020 (3 pages).

DEVICE AND METHOD OF OBTAINING DIOLS AND OTHER CHEMICALS USING DECARBOXYLATION

RELATED APPLICATIONS

This application is a continuation of U.S. patent application Ser. No. 13/790,744, filed Mar. 3, 2013, now U.S. Pat. No. 9,957,622, which is a continuation-in-part of U.S. patent application Ser. No. 12/840,401, filed Jul. 21, 2010, which in turn, claims the benefit of U.S. Provisional Patent Applications Nos. 61/258,557 filed Nov. 5, 1999, 61/228,078 filed Jul. 23, 2009, and 61/260,961 filed Nov. 13, 2009. U.S. patent application Ser. No. 13/790,744, filed Mar. 3, 2013 is also a continuation-in-part of U.S. patent application Ser. No. 12/840,913, filed Jul. 21, 2010. U.S. patent application Ser. No. 13/790,744, filed Mar. 3, 2013 is also a continuation-in-part of U.S. patent application Ser. No. 12/840,508, filed Jul. 21, 2010, now U.S. Pat. No. 8,506,789. U.S. patent application Ser. No. 13/790,744, filed Mar. 3, 2013 is also a continuation-in-part of U.S. patent application Ser. No. 13/612,192 filed Sep. 12, 2012. U.S. patent application Ser. No. 13/790,744, filed Mar. 3, 2013 is also a continuation-in-part of U.S. patent application Ser. No. 13/092,685, filed Apr. 22, 2011, now U.S. Pat. No. 9,051,656.

All of the above-recited provisional and non-provisional applications are expressly incorporated herein by reference.

TECHNICAL FIELD

The present disclosure relates to a method of producing hydrocarbon materials such as diols. More specifically, the present disclosure provides an electrochemical decarboxylation process whereby diols, or other similar chemicals, may be formed.

BACKGROUND

The above-recited patent applications teach methods of forming hydrocarbons and other molecules using an electrochemical decarboxylation process ("EDP"). The reader is presumed to be familiar with the disclosure and content of these prior applications.

Many organic molecules are used in industry and in commercial processing. One type of these molecules are dienes, such as, for example, 1, 3-butadiene. Butadiene has a structure $CH_2CHCHCH_2$. Dienes have two double bonds in the molecule.

Commercially, diene monomers are produced by one of the four conventional methods; 1) by catalytic dehydrogenation of concentrate n-butylenes, 2) by catalytic dehydrogenation of n-butane, 3) as a by-product in low yields from severe high-temperature cracking of liquid hydrocarbons, and 4) from alcohols and/or diols by a combination of catalytic dehydrogenation and/or hydration. U.S. Pat. No. 3,992,471 describes the production of dienes and is incorporated herein by reference.)

One of the most widely used methods to produce dienes is the dehydration of the corresponding diol, for example 1,3-butadiene is obtained from the dehydration of either 1,4-butanediol or 2,3-butanediol. Such diol molecules are conventionally obtained using the Reppe reaction, hydrolysis of halogenated compounds, or the hydrogenation of anhydrides. All of these conventional pathways involve multiple processes which require high temperature catalytic reactions using petroleum based feedstock.

It would be advantageous to find a manufacturing method to produce diene monomers for the vastly important elastic materials from non-petroleum sources, such as bio generated feedstock and using more economically sustainable processes, for example processes that do not relay on expensive catalysis, high temperatures and pressures. It is the aim of the disclosed invention to synthesize diene monomers starting from biomass, which are then electrochemically converted to diols followed by the conversion to dienes by a dehydration step. Such a process affords a non-petroleum source of diene monomers using a methodology that requires only one catalytic high temperature process.

SUMMARY

The present embodiments relate to methods to synthesize hydrocarbons such as, for example, hydrocarbons that have at least two oxygen containing functional groups. These methods may produce such hydrocarbons from inexpensive bio-generated precursors using an electrochemical decarboxylation process. The decarboxylation process converts alkali salts of carboxylic acids to hydrocarbon compounds which have two or more oxygen containing substituents.

In one example, the decarboxylation process is used to produce diols which can then be dehydrated to form dienes. One benefit of this process is that the final structure of the diene can be tuned by the choice of the carboxylic acid used as the precursor. There are a large number of carboxylic acids available from both natural and synthetic sources (including biomass), which allows the structure and functional group of the diene to be tailored for specific properties and functionalities. The diene that is produced can then be used in a variety of different applications. For example, the diene may be used as a starting material for the production of synthetic rubber. The ability to control the structure and functional groups in the diene allows the rubber to be designed and tailored, as desired. Besides providing a low temperature route to custom organic molecules containing multiple oxygen containing function groups, the present embodiments provide a synthetic methodology to produce custom organic molecules from various feedstocks (including renewable bio-generated feedstocks). Thus, the present embodiments may operate to produce dienes from renewable feedstocks (biomass) instead of currently used petroleum based feedstocks.

The production of diols is used herein as an example to demonstrate the present processes for producing hydrocarbons or other organic molecules with multiple functional groups. Conversion of the diols to dienes may produce dienes in which the double bonds are located at the terminal positions of the carbon chain. Some non-limiting examples are; 1,3-butadiene, 1,4-pentadiene, isoprene, and 1,5-hexadiene. Such monomers can then be used to make a variety of polymer products including acrylonitrile butadiene styrene (ABS). (ABS is the largest used (by volume) thermoplastic with over 1 million tons per year produced globally, and thus, the present embodiments provide methods for producing the starting materials for ABS from a renewable, non-petroleum based sources.)

In one example, the present processes may involve four (4) processing steps. These steps include: 1) fermentation to produce carboxylic acids from biomass, 2) saponification of the carboxylic acids to form alkali metal carboxylate salts, 3) decarboxylation of the alkali carboxylates forming diols, and 4) dehydration of the diols to form the desired diene monomer.

The fermentation of biomass to produce carboxylic acids is a well-known and studied process that is used to produce starting materials for a variety of bio-generated products. The fermentation is performed on a slurry of the biomass, using specific bacteria chosen for the production of the desired carboxylic acid. The composition of the biomass slurry used for the fermentation depends on the feedstock and conditions that are required by the bacteria. For most carboxylic acids, there are a variety of bacteria that are used in industry, permitting the carboxylic acid to be produced from a variety of biomass materials. For example, lactic acid can be produced via the fermentation of glucose, molasses, corn or cheese whey. Depending on the bacteria used in the fermentation process, the pH of the resulting carboxylic stream can be low enough that the pure acid is directly obtained or it could have a pH range in which salts of the carboxylic acid are obtained. For example, lactic acid is most commonly produced as calcium lactate because the low solubility allows this to be easily isolated from the fermentation bath as taught by U.S. Patent Application Publication No. 2012/0142945, which application is incorporated herein by reference. The calcium lactate is then acidified allowing the lactic acid to be obtained. For the present embodiments, the carboxylic acid may be in the acidic form and may have additional functional groups present which provide the desired functionality of the final synthesized compound.

Lactic acid is produced commercially on hundreds of thousands metric tons annual through the fermentation of carbohydrates such as sucrose, glucose, or lactose. Glucose which can be converted from sucrose or directly obtained from starch is converted into two moles of lactic acid during the fermentation process. The fermentation of lactose, which is a dairy by-product, in the presence of water produces four moles of lactic acid. These well established routes to produce lactic acid from biomass make it a renewable and economical precursor for producing butadiene, which is currently produce using petroleum based hydrocarbons.

The saponification of carboxylic acid follows from the generally accepted procedure of reacting the carboxylic acid with an alkali metal base (MOH) at an elevated temperature. Some non-limiting examples of alkali metal bases are lithium hydroxide, sodium hydroxide, potassium hydroxide, etc. A generic neutralization reaction is written as follows:

$$RCO_2H + MOH \rightarrow RCO_2M + H_2O$$

where "R" represents organic moieties, M represents an alkali metal, such as, for example sodium or lithium.

In one embodiment, this saponification reaction is carried out in a solvent with an alkoxide present such that the reaction forms an alkali carboxylate which precipitates out of solution. In such an embodiment, the alkali carboxylate salt can be easily isolated to prepare the anolyte needed for the subsequent decarboxylation step.

The alkali carboxylate may be electrochemically decarboxylated to form a radical coupling product, because the starting carboxylate has at least one additional functional group present, the resulting coupling product will have two functional groups present, forming (for example) a diol. This process is performed using a two compartment electrochemical cell, which employs a ceramic membrane commercially available from Ceramatec, Inc. of Salt Lake City, Utah. Ceramatec sells this membrane under the NaSelect® trademark. The electrolysis in the anolyte compartment follows the generic reaction scheme known as a modified Kolbe electrolysis reaction:

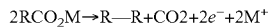

where "R" represents organic moieties, M represents an alkali metal, such as, for example sodium or lithium.

In another embodiment, the electrolysis in the anolyte compartment leads to products derived from a "non-Kolbe electrolysis" pathway. One of the possible products of a non-Kolbe electrolysis is an aldehyde:

This pathway can be promoted by the location and type of the additional functional groups on the carboxyl anion. The obtained aldehyde can then be reacted to form a hydroxyl-ketone following, for example, the nucleophilic addition that occurs in a basic medium. A non-exclusive summary of this reaction pathway is below.

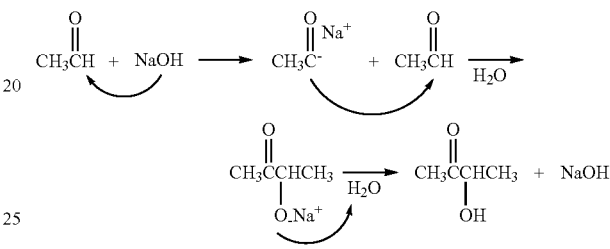

In some embodiments, the compound obtained directly from the non-Kolbe electrolysis is economically viable, as is the case shown above in which the process produces acetoin. (Acetoin is useful as a food additive.) In other embodiments, the hydroxyl-ketone can be reduced to a diol with an additional processing step.

Once the diol is obtained (whether through the Kolbe or non-Kolbe pathway), the diol may then be subjected to a dehydration reaction, thereby producing water and a diene. The dehydration can be carried out many ways, for example in the presence of acid and a catalyst.

It should be noted that a conventional Kolbe process does not permit radical-radical coupling when there is an electron donating group in the alpha-position to the carboxylic acid group. However, by using the present techniques, there is more control over the voltage across the cell, thereby giving a diol yield. Apparently, in a traditional Kolbe reaction, the voltage across the cell is too high to allow radical-radical coupling of compounds with an electron donating group in this position. Thus, the present embodiments provide for significant advantages.

DETAILED DESCRIPTION

Some terms and their definitions that will be used throughout the description of the disclosed invention follows. "Bio generated" or "bio-generated," as used herein, refers to substances, either solid or fluid, which are derived from a renewable resource of biological origin. "Hydrocarbon," is defined as a compound consisting of carbon and hydrogen and can refer to saturated or unsaturated compounds. "Diene," is defined as a hydrocarbon with two double bonds, these can be conjugated or non-conjugated. "Diol," is defined as a compound with two alcohol groups present. "Carboxylic acid," is a compound with the general formula $RCO_2H$, where the "R" can represent saturated or unsaturated hydrocarbon chains. "Decarboxylation," as used herein refers to the process of removing $CO_2$ from a compound, specifically from a carboxylic acid or anion. "Elastic," as used herein, is defined as the property of a material to return to its original shape after removing an external stress that causes deformation. "Symmetric" as used herein, refers to chemical structures that have at least one mirror plan symmetry element and "non-symmetric" refers to chemical structures that do not have a mirror plan. "Substituent" and "functional group" are used interchangeably, and herein refer to an atom or group of atoms that has substituted a hydrogen atom on a carbon chain of a hydrocarbon.

The present embodiments are generally directed to methods used to synthesize organic compounds with at least two oxygen containing functional groups, from inexpensive biogenerated precursors using an electrochemical decarboxylation process (EDP). In an example demonstrating the utility of this invention, the oxygen containing organic compounds are used to produce dienes.

Figure 1:
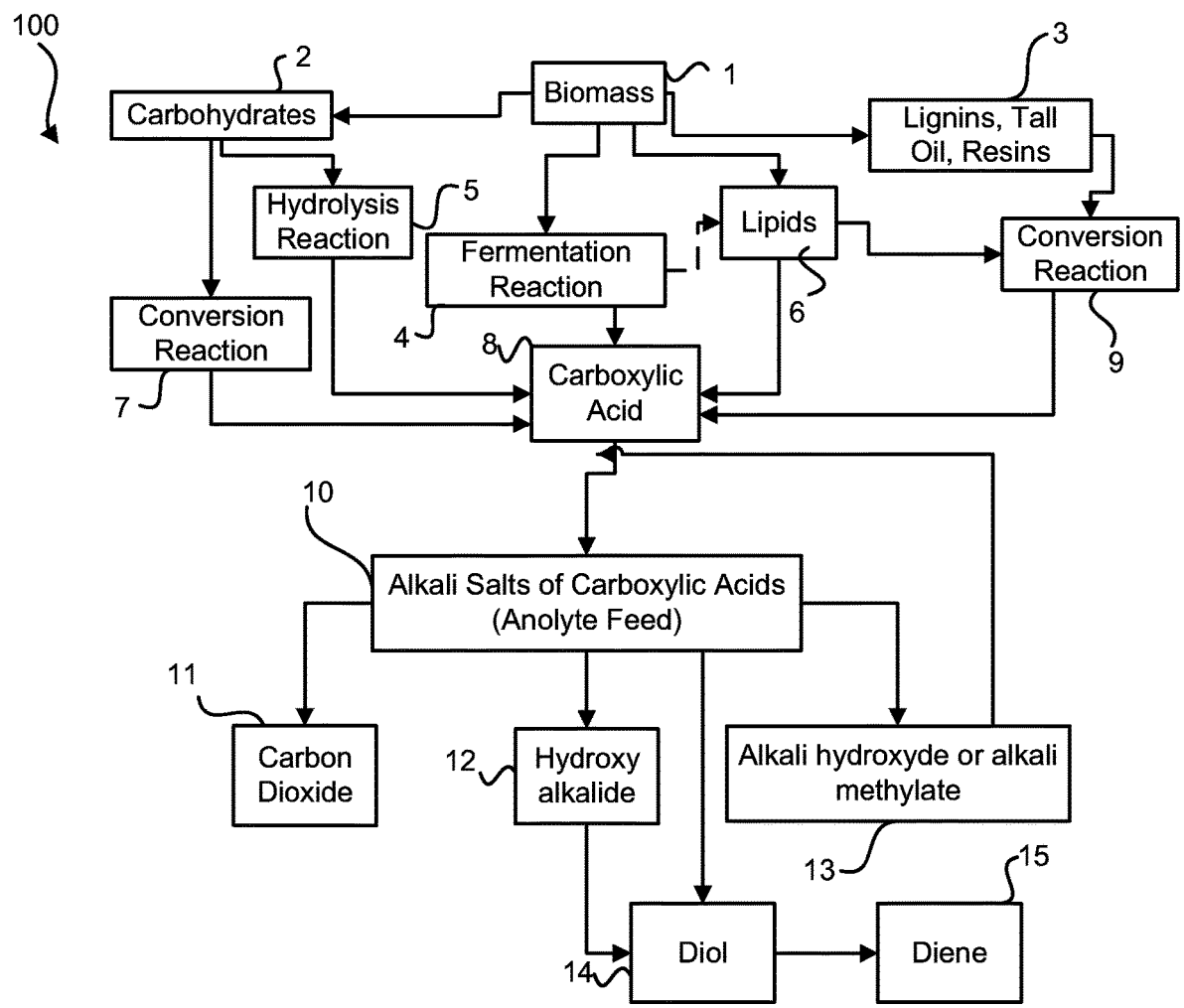
FIG. 1 shows a schematic drawing of method through which biomass may be converted into alkali metal salts of carboxylic acids, which in turn, may be converted into diols and further processed, if desired, into dienes.

Referring now to FIG. 1, a flow chart is illustrated which indicates how the biomass may be converted into diols, dienes and/or other useful organic molecules. More specifically, FIG. 1, shows a method by which biomass 1 may be converted into a diol 14 or diene 15. In this method, a sample of biomass 1 is obtained. FIG. 1 shows a variety of different processes by which the biomass may be converted into a carboxylic acid 8. The most direct way for this conversion is through a fermentation reaction 4.

In other embodiments, the biomass 1 may be converted (separated) into carbohydrates 2, which may undergo hydrolysis reaction 5 to obtain the carboxylic acid 8. Alternatively, instead of using the hydrolysis reaction 5, the carbohydrate 2 may undergo a conversion reaction 7 that results in the formation of a carboxylic acid 8.

In other embodiments, the biomass 1 may be converted (separated) into lignins, tall oil and/or resins 3. This material 3 may then undergo a conversion reaction 9 to obtain the carboxylic acid 8. In other embodiments, the biomass 1 may be converted (separated) into lipids 6 which may be converted into the carboxylic acid 8, or may undergo, as needed, a conversion reaction 9 to obtain the carboxylic acid 8.

Following the formation of the carboxylic acids 8, these materials may be converted to alkali salts of carboxylic acids 10. These alkali salts 10 are the preferred precursor for the electrochemical decarboxylation process. This process may transform the alkali salts 10 into the diols 14. At the same time, this decarboxylation reaction may form carbon dioxide 11, a hydroxyl alkalide 12 and an alkali hydroxide or an alkali methylate 13. It should be noted that once the diol 14 is obtained, it may be converted into the diene 15.

According to the disclosed embodiments, shown in FIG. 1, the final structure of the oxygen functionalized organic compound is dependent on the carboxylic acid therefor dependent on the biomass used. It should be appreciated by one skill in the art that there are numerous sources of biomass and carboxylic acids derived from them, which thus, can lead to a large number of organic compounds that can be produced following the process flow given in FIG. 1.

As noted here, the dienes that are produced in the present embodiments may be dienes that can be used as monomers for the production of elastic materials. The large number of carboxylate substrates that can be obtained from biomass permits the monomer to be tailored in order to obtain an elastic material with the desired properties. Some non-limiting examples of the variances that can be tailored into the monomer are; number of carbons, degree of branching in the carbon chain, and the ability to include other functional groups. Besides providing a low temperature route to custom monomers, this invention provides a methodology to produce said monomers from a renewable feedstock instead of relying on petroleum based feedstocks.

Figure 2:
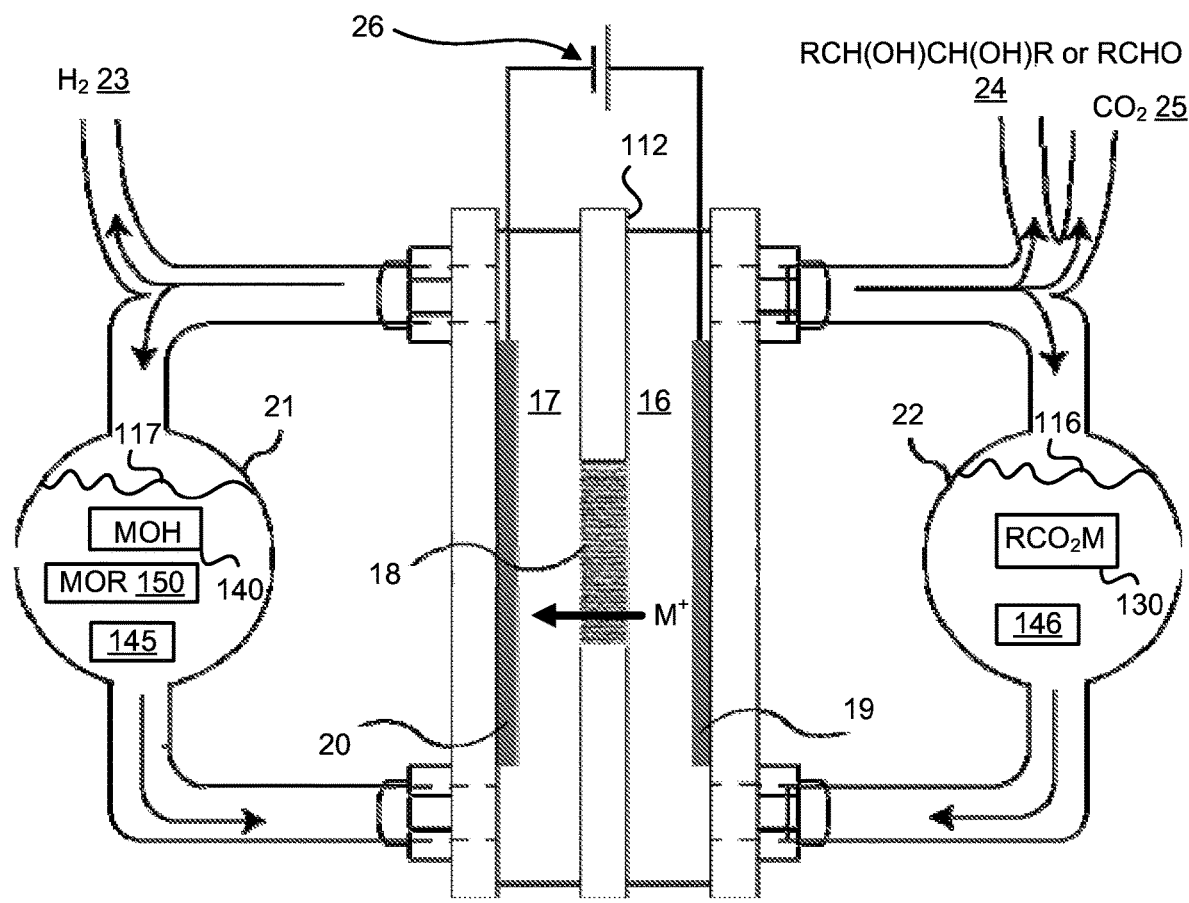
FIG. 2 is a schematic drawing of an electrochemical cell that may be used to decarboxylate the alkali metal salt of the carboxylic acid.

Referring now to FIG. 2, a schematic of an electrochemical cell 110 that may be used in the decarboxylation reaction of FIG. 1. The cell 110 comprises two separate compartments, namely an anolyte compartment 16 and a catholyte compartment 17. The two compartments 16, 17 may be separated by a scaffold 112 which houses an alkali metal ion selective membrane 18. The membrane may be, for example, a NaSelect® membrane from Ceramatec Inc. of Salt Lake City, Utah.

The anolyte compartment 16 is in fluid communication with an anolyte reservoir 22. The anolyte reservoir houses a quantity of anolyte 116. The anolyte 116 may be pumped from the anolyte reservoir 22 into the anolyte compartment 16. The anolyte compartment 16 houses an anode 19. Thus, when the anolyte solution 116 is pumped into the anolyte compartment 16, the anolyte 116 will contact the anode 19 (so that the anodic reaction may take place). As shown in FIG. 2, the anolyte 116 may comprise a solution of the alkali metal salt of the carboxylic acid 130. (As known in the art, this alkali salt $RCO_2M$ 130, may dissociate into its constituent ions ($RCO_2^-$ and $M^+$), depending upon the particular solvent 146 that is used).

The catholyte compartment 17 is also in fluid communication with a catholyte reservoir 21. The catholyte reservoir 21 houses a quantity of catholyte 117. The catholyte 117 may be pumped from the catholyte reservoir 21 into the catholyte compartment 17. The catholyte compartment 17 houses a cathode 20. Thus, when the catholyte solution 117 is pumped into the catholyte compartment 17, the catholyte 116 will contact the cathode 20 (so that the cathodic reaction may take place). As shown in FIG. 2, the catholyte 117 may comprise a solution of an alkali metal hydroxide 140 (MOH) or an alkali metal alkoxide 150 (MOR). (As known in the art, this alkali metal hydroxide 140 may dissociate into its constituent ions ($OH^-$ and $M^+$) and the alkali metal alkoxide

150 may dissociate into M⁺ and OR⁻, depending upon the particular solvent 145 that is used). The anolyte 116 and the catholyte 117 may both comprise a solvent 145, 146, which may be the same solvent or a different solvent, depending upon the particular embodiment.

When a voltage source 26 applies a potential across the cell 110, alkali ions (M⁺) travel across the membrane 18 as reduction at the cathode 20 forms hydrogen 23 which evolves from the cell 110. At the anode 19, oxidation produces radicals which form the radically-coupled product 24 as well as carbon dioxide 25.

During the electrochemical reaction, oxidation at surface of the anode 19 occurs causing the decarboxylation of the carboxyl functional group forming a radical and $CO_2$. According to one embodiment of the invention the radical then reacts directly with a second radical to form a symmetric organic molecule with at least two oxygen containing functional groups. For a non-limiting example, the radicals combine to make a diol. According to another embodiment of the invention a two electron oxidation occurs at the surface of the anode 19. This is then followed by a nucleophilic addition, making an unsymmetrical compound which has at least two oxygen containing functional groups. In one embodiment, this unsymmetrical compound can easily be converted to a diol. In another embodiment, the anolyte contains multiple types of carboxylate salts, and upon oxidation the radicals form heterocoupling products. It should be noted that the heterocoupling will lead to non-symmetric compounds with oxygen containing functional groups, whereas the homocoupling leads to symmetric compounds.

On the other side of the cell 110, the reduction of the catholyte 117 is occurring and to maintain charge balance a positive ion (M⁺) must transfer from the anode 19 to the cathode 20, and in the case when the anolyte 116 and catholyte 117 are separated there needs to be a path for the positive ions to transfer between compartments. In one embodiment, the ion conducting membrane 18 selectively transfers alkali ions (M⁺), including but not limited to the ions of, sodium, lithium, and potassium, from the anolyte 116 to the catholyte 117 under the influence of an applied electrical field. In one embodiment, a NaSelect® membrane 18 selectively transfers sodium ions between the anolyte 116 and catholyte 117.

In one particular embodiment, the ion conductive membrane 18 is between 10 and 5000 microns thick, or more preferably the membrane 18 is between 100 and 1000 microns thick, or even more preferably, the membrane 18 is between 200 and 700 microns thick. In one embodiment the membrane 18 is in the form of a disk with a planar configuration. The disk may have diameters between 0.25-25 cm. In one embodiment, the disk diameter is between 1.27-12.7 cm. In other embodiments, the disk diameter is between 2.54-7.62 cm. There may be more than one disk and the disk or disks may be assembled in a scaffold 112. In another embodiment, the membrane 18 has a cylindrical configuration with an average diameter of the cylinder being between 0.25-25 cm. In other embodiments, the diameter of the cylinder may be between 1.27-12.7 cm. In yet other embodiments, the diameter of the cylinder may be between 2.54-7.62 cm.

The electrochemical cell 110 can be in a parallel plate configuration which uses flat membranes and electrodes, for example as shown in FIG. 2. In another embodiment, the electrochemical cell is in a tubular configuration which uses tubular electrodes and membranes. It should be clear to one skilled in the art that the cell configurations listed above both have advantages and disadvantages which would lead to one being chosen over the other depending on the requirements of the specific carboxylic salt being decarboxylated. It should also be clear to one skilled in the art that the process described by the present invention can be applied in a variety of cell designs.

The anode 19 can comprise any suitable material that allows oxidation reactions to occur in the anolyte compartment 16 when an electrical potential is applied by voltage source 26 between the anode 19 and cathode 20. Some non-limiting examples of anode materials include, but are not limited to, platinum, titanium, nickel, cobalt, iron, stainless steel, lead dioxide, metal alloys, combination thereof, and other known or novel anode materials. In one embodiment, the anode 19 may comprise iron-nickel alloys such as KOVAR® or INVAR®. In other embodiments, the anode 19 may comprise carbon based electrodes such as boron doped diamond, glassy carbon, and synthetic carbon. Additionally, in some embodiments the anode comprises a dimensionally stable anode (DSA), which may include, but is not limited to, rhenium dioxide and tantalum pentoxide on a titanium substrate.

The cathode 20 may also be fabricated of any suitable cathode material that allows the reduction of water or methanol producing hydroxide or methoxide ions and hydrogen gas. The cathode may comprise of the materials used for the anode 19. Alternatively, the cathode 20 may be comprised of materials different from that which was used for the anode 19. Some non-limiting examples of suitable cathode materials include without limitation, nickel, stainless steel, graphite, and any other suitable cathode material that is known or novel.

In one embodiment, the electrodes have a smooth morphology such as a foil or thin film. In another embodiment, the anode 19 and cathode 20 have a high surface area morphology, for example, but not limited to, a foam, grit, or other porous structure. In some embodiments, the anode 19 and the cathode 20 have the same morphology, while in other embodiments, the electrodes may have a different morphology.

It should be noted that the embodiment shown in FIG. 2 is a divided cell that comprises two distinct chambers. Other embodiments may be constructed in which the cell is a single-chambered cell, such that the electrolyte is fed into this chamber without an ion-selective membrane 18.

In order to create a diol according to the present embodiments, the alkali salt 130 of the carboxylic acid may comprise one or more alcohol (OH) functional groups.

The anolyte solution 116 may comprise of a polar organic solvent 146. Some non-limiting examples of suitable polar organic solvents include without limitation, methanol, ethanol, isopropanol, n-propanol, acetone, acetonitrile, dioxane, butanol, DMSO, $CS_2$, diethyl carbonate, ethylene carbonate, and glycerol. In one embodiment, the solvent is an ethyl ester which is formed from a carboxylic acid and ethanol, or more preferably a carboxylic acid similar in carbon number to the anion being oxidized and ethanol. Most preferably, the solvent is an ester formed from the carboxylic acid of the anion being oxidized and ethanol. An example of this type of solvent would be ethyl lactate.

In other embodiments, the anolyte solution 116 may comprise of an ionic liquid (IL). A non-limiting example is an IL with a phosphonium based cation with four substituents. In one embodiment, the four substituents of the phosphonium cation are each independently an alkyl group, a cycloalkyl group, an alkenyl group and an aryl group. In another embodiment, some/all of the substituents are of a similar group. In a further embodiment, some/all of the substituents are the same. In some embodiments, the anion of the ionic liquid is a carboxylate ion, more preferably the carboxylate ion is similar to the carboxylate anion being oxidized during the electrolysis, or most preferably the carboxylate ion is the same anion being oxidized during the electrolysis.

Certain alkali ion conductive membranes, for example NaSICON and LiSICON-type membranes, have a high temperature tolerance and thus the anolyte solution 116 may be heated to a higher temperature without substantially affecting the temperature of the catholyte solution 117 or the functionality of the membrane 18. This means molten salts or acids may be used to dissolve the carboxylate salts in the anolyte 116. Thus, in one embodiment, the anolyte 116 is the molten salt of the carboxylate anion that is being oxidized.

The anolyte solution 116 may optionally contain a supporting electrolyte which is soluble in the solvent and provides high electrolyte conductivity in the anolyte solution. Non-limiting examples of supporting electrolytes include alkali metal hydroxide, alkali metal salts, tetrafluoroborate, tetramethylammonium hexafluorophosphate, tetrabutylammonium tetrafluorobotate, tetramethylammonium perchlorate, and tetraethylammonium perchlorate. It should be appreciable to those skilled in the art that other soluble ionic compounds may be used.

The catholyte 21 may comprise of a solvent 145 that is the same or different than the anolyte solvent 146. This is afforded because the ion conductive membrane 18 isolates the compartments from each other. Thus, the anolyte solvent 146 and the catholyte solvent 145 may be separately selected specifically for the reactions that occur in each compartment and/or the solubility of the chemicals required for the specific reactions. (A mixture of solvents may be used as the solvents 145, 146, as desired.) This permits one to design an inexpensive catholyte 117 which may have different properties than the anolyte 116, for example to have high ionic conductivity.

In one embodiment of the invention the catholyte 117 is comprised of water and an unsaturated alkali hydroxide 140. The hydroxide concentration is between 0.1-50% by weight, or more preferably between 5-25% by weight, or most preferably between 7-15% by weight. Another embodiment may be constructed in which the catholyte 117 consists of alkali methylate 150. The temperature of the catholyte 117 may or may not be the same temperature of the anolyte 116.

When a potential is applied to the cathode 20, a reduction reaction occurs. When the catholyte solution 117 is an aqueous based solution, water is reduced to hydrogen gas 23 and hydroxide ions. The hydroxide formed can then combine with the alkali ion that is transported through the ion conducting membrane 18, causing the alkali hydroxide concentration of the catholyte 117 to increase as the electrolysis is performed. It will be appreciated that the catholyte product stream comprises a base which may be used to neutralize the carboxylic acid to produce the alkali metal salt of the carboxylic acid 10 (as shown in FIG. 1). Thus, the base consumed by the acid neutralization step may be produced in the catholyte compartment 17, recovered and re-used in future acid neutralization reactions or other chemical processes.

When an electrical potential is applied to the anode 19, oxidation occurs. In one embodiment, the oxidation of a carboxylic acid or a carboxylate anion leads to decarboxylation, producing carbon dioxide and an alkyl radical. The radical can then combine with another radical to form alkyl-alkyl coupling products, following a modified Kolbe electrolysis process or it can react with other species present at the electrode's surface following non-Kolbe electrolysis. In another embodiment, when there is an electron donating group in the alpha position to the carboxyl group, the decarboxylation leads to the formation of $CO_2$ and a carbocation from a two electron oxidation. Following its formation, the carbocation can then participate in nucleophilic reactions instead of coupling reactions. These potential mechanisms are discussed in greater detail herein.

In one embodiment, the electrolytic cell 110 may be operated in a continuous mode. In continuous mode, the cell 110 is initially filled with anolyte solution 116 and catholyte solution 117 and then, during operation, additional solution is fed into the cell 110, and products, by-products, and/or diluted solutions are removed from the cell 110 without ceasing operation of the cell. In another embodiment, the electrolytic cell 110 is operated in batch mode. In batch mode, the anolyte solution 116 and catholyte solution 117 are fed initially into the cell 110 and then the cell 110 is operated until a desired concentration of the product is produced, then the cell 110 is emptied and the products are collected. The cell 110 is then re-filled to start the process again. Also, in either method, the feeding of solution may be done using a premade solution or using components that form the solution in situ. It should be noted in both continuous and batch mode, the anolyte 116 can be added to the solution to maintain the alkali ion concentration at a certain level.

As disclosed above, the anolyte solution 116 comprises a solvent 146, and an alkali metal salt of a carboxylic acid 130. The choice of carboxylic acid is dependent on the desired product and can be chosen from any class of carboxylic acids. Some non-limiting examples are fatty acids, alkyl carboxylic acids, amino acids, aryl carboxylic acids, and di- and tri-carboxylic acids. The carboxylic acid can also have multiple substituents present, in addition to, the carboxylic group. These additional functional groups can be located at any carbon site of the carboxylic acid, and, in some embodiments, are located in the alpha position to the carboxylate carbon. Both electron donating and withdrawing substituent can be present on the carboxylic acid. Some non-limiting examples of electron donating substituents are hydroxyl, amine, amide, and ether groups. Some non-limiting examples of electron withdrawing substituents are halogens, nitriles, carbonyl, nitro, and nitride groups. The functional group present in the alpha position to the carboxylate will determine whether the decarboxylation will follow a one electron or two electron oxidation mechanism. In one embodiment, one electron oxidation will occur, favoring radical-radical coupling because there is no substituent present in the alpha position or the substituent is an electron withdrawing group. In another embodiment, the two electron oxidation is favored, because there is an electron donating group present in the alpha position to the carboxylate group.

As noted above in conjunction with FIG. 1, the carboxylic acid ($RCO_2H$) may be converted into the corresponding alkali salt ($RCO_2M$) via acid neutralization. In some embodiments, the R group of the carboxylic acid is a hydrocarbon having a $C_2$ to $C_{22}$ hydrocarbon chain and at least one hydrogen that has been substituted for a functional group containing oxygen. Some non-limiting examples of functional groups that can be present are hydroxyl, phenyl, esters, ethers, and ketones. In one embodiment, the carboxylic acid has other substituents which do not contain oxygen such as: halide, nitrile, amine, amide, and sulfide. For example, in the production of monomers for elastic materials, the additional substituents can impart additional properties or be used to modify the elastic material after the dienes have been polymerized. In one embodiment, the carboxylic acid is obtained from biomass with the additional substituent already present. In another embodiment, the biomass derived carboxylic acid is first modified to include the additional functional groups.

The alkali carboxylate is added to a suitable electrolyte which is used as the anolyte solution 116. The anolyte solution 116 may optionally include a supporting electrolyte if the conductivity of the alkali carboxylate is low and causes high solution resistance. The anolyte solution is fed either continuously or in batch mode into the electrochemical cell 110.

The particular reactions at the cathode 20 and anode 19 will now be described. Specifically, at the anode 19, decarboxylation occurs:

$$RCO_2Na \rightarrow R\cdot + CO_2 + Na^+ + e^-$$

Once the radical (R.) is formed, it will react with other species at the electrode's surface, and if it reacts with another radical of the same carboxylate anion, it will form a homocoupling product:

$$R\cdot + R\cdot \rightarrow R-R$$

The coupled product may be a symmetric compound containing at least two oxygen containing functional groups. This product can be in itself the chemical of interest, for example as a solvent, or it can be converted into a chemical of interest. For example, the function groups can be converted into double bonds and the diene can be used as monomers for the production of elastic material. If the radical combines with a radical of a different carboxylate anion, then a heterocoupling product will be formed and an unsymmetrical compound will be obtained.

Another embodiment involves decarboxylation of a carboxylate anion that has an electron donating group present in the alpha position of the carbon chain. In this case, the radical formed during decarboxylation may follow a different pathway and will either go through a rearrangement reaction or lose an additional electron according to the following reactions:

$$RCH_2C(Y)H\cdot \rightarrow RCH_2CH=Y+H\cdot$$

$$RCH_2C(Y)H\cdot \rightarrow RCH_2RYH^+ + e^-$$

$$RCH_2RYH^+ + OH^- \rightarrow RCH=RHY + H_2O$$

In these reactions, the Y represents an electron donating group in the alpha position to the carboxylic group. The compounds formed in these equations can be of interest by themselves, or can be converted into compounds of interest with additional steps. Not limited by reaction pathway, the products of the reactions above can for example be converted into a diol and then into a diene. A non-limiting example of these additional chemical steps is shown below.

One method to promote radical-radical coupling is to perform the decarboxylation at high current densities. To achieve these high current densities with low voltages, a highly conductive catholyte is used in the cathode compartment of the cell. Non-limiting examples of such catholytes are aqueous alkali hydroxide and non-aqueous methanol/alkali methoxide solutions. These solutions are reduced at the cathode leading to the formation of hydrogen gas and alkali metal hydroxides.

Some advantages of this embodiment, using the alkali metal salt of the alkyl carboxylic acid instead of the carboxylic acid itself, are: 1) $RCO_2M$ is more polar than $RCO_2H$ and so more probable to decarboxylate at lower voltages, 2) The electrolyte conductivity may be higher for alkali metal salts then the acid solutions, 3) The anolyte and catholyte solution can be completely different allowing favorable reactions to take place at either/both electrodes.

The following non-limiting examples are given to illustrate various embodiments within the scope of the present invention.

EXAMPLES

Several examples will be given to demonstrate the technical feasibility of converting inexpensive carboxylic acids into functionalized hydrocarbons using the electrochemical decarboxylation process at low temperatures and pressures. The examples demonstrate the decarboxylation of sodium salts of carboxylic acids with hydroxyl groups using electrolytic cells equipped with a NaSelect® NaSICON membrane manufactured by Ceramatec, Inc., Salt Lake City, Utah. The decarboxylation produces compounds with at least two functional groups containing oxygen, which have application as solvents or food additives, and, with an additional step, can be converted into diene monomers for the production of elastic materials.

The examples disclosed herein used an experimental setup which is schematically shown in FIG. 2. The cell employed for these experiments was a micro flow cell, allowing both the anolyte and catholyte to be pumped through the cell while minimizing the distance between the electrodes and the membrane. The membranes used in the examples consisted of 2.54 cm diameter NaSICON disks of about 1 mm thickness which were housed on scaffolds in the center of the cells. As the scaffold and membrane physically separate the anode and cathode compartments, there was a separate reservoir and temperature controlled hotplate for the anolyte and catholyte. This allowed the chemistry and conditions of each electrolyte to be optimized for the respective electrode reactions. A multiple-head parasitic pump was

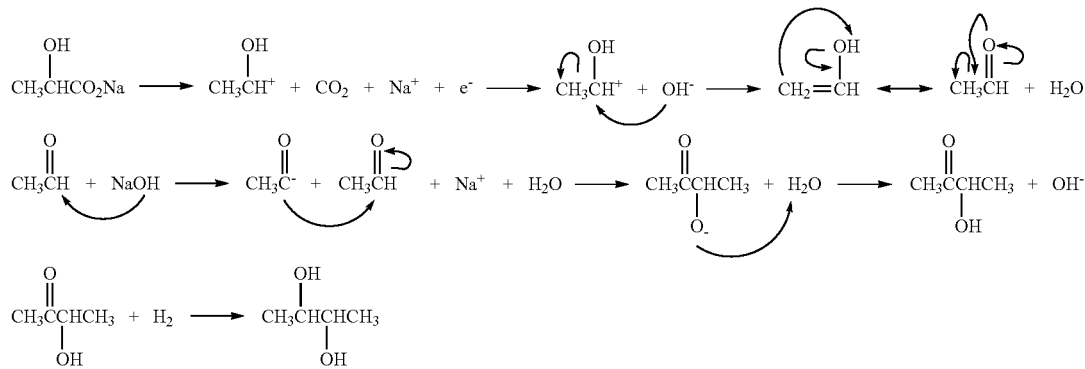

used to pump both electrolytes into the electrolysis cell, and, depending on the temperature of the electrolytes the tubing between the cell, pump, and reservoir was insulated.

The anolyte, which contains the sodium salt of the carboxylic acid, is made by dissolving at least 10% of the salt into a polar organic solvent. This was conducted using two methods. For the first method, the sodium salt was prepared directly in the polar organic solvent by the addition of the carboxylic acid and NaOH. To ensure the complete deprotonation of the acid, the cell was operated at a pH (8-12) indicative of excess NaOH. The second method consisted of preparing the sodium salt in a separate solution following conventional saponification reactions and then dissolving the prepared salt into a polar organic solvent. For this method, a general saponification procedure was used during which the sodium carboxylate forms as the carboxylic acid is neutralized. The catholyte can be made from any solution containing sodium salts, and for the examples given herein an aqueous sodium hydroxide solution was used. To obtain low solution resistance, the temperatures of the electrolytes were increased to 50° C. to improve both the solubility and conductivity.

Once the reservoirs reached the desired temperatures, a power supply (BP Precision 1786B) was connected and a current density between 10 and 100 mA/cm$^2$ was applied. During the electrolysis the voltage and current were monitored using a Data Acquisition Unit (Agilent 3490A) controlled by LabVIEW. The applied current density caused oxidation to occur at the anode (smooth platinum) and reduction to occur at the cathode (nickel), with each electrode having an area of 11 cm$^2$. As the power supply transports electrons from the anode to the cathode, a charge balance must be maintained across the cell by the diffusion of positively charge ions. Given the high selectivity of the NaSICON membrane for Na-ions, it is the only species that can provide this balance, thus a high concentration of the sodium salt was desired.

As the classic solvent for Kolbe electrolysis, methanol was one of the solvents used in the examples provided. In methanol, the solubility of the Na-lactate was found to be 20% after the addition of mild heat. A second example using ethyl lactate as the solvent is given demonstrating one of the embodiments of the present invention, and the solubility the sodium lactate in the ethyl lactate was found to be just below 20%.

Gas chromatography (GC) was used to characterize the products obtained in the examples given below. A high polarity polyethylene glycol (PEG) column (HP INNOWax, 30 m, 0.25 mm, 0.25 μm) was used with a temperature program that held 125° C. for 5 min, then increased at 10° C./min to 250° C. and held this temperature for 5 min. Because the reaction solutions contained sodium salts, which can cause problems with different components of a GC instrument, a post reaction processing step was employed to remove the sodium salts from the sample.

Distillation was one method employed to separate the products from the salts of the reaction solution. The high boiling points of the products obtained (148-135° C.) caused a "slurry of salts" to be precipitated out as the methanol was distilled from the reaction solution. This issue was circumvented by performing the distillation using a mixture of the reaction solution and glycerol (BP 290° C.). This permitted the distillation to be carried out at temperatures that were required to distill the product, while the glycerol acted as a distillation medium, keeping the salts from precipitating out and inhibiting the distillation of the product.

The second post reaction treatment was used to remove the sodium salt from the reaction solution, via acidification with sulfuric acid. The addition of $H_2SO_4$ acidified the carboxylate ion present and caused the Na-ions to precipitate out of the solution as $Na_2SO_4$. After filtering the $Na_2SO_4$ from the solution it could be directly injected into the GC for analysis. To quantify the amount of product produced while using one of the two post reaction treatments, 1-butanol was used as an internal standard to make the calibration curves.

Example 1

The electrochemical decarboxylation process disclosed in the present invention was used to convert the sodium salt of a carboxylic acid with a hydroxyl group to a diol. The diol produced can be used as a solvent or it can be further converted into a diene. The anolyte for this decarboxylation consisted of 10% by weight sodium 3-hydoxypropionate in methanol, and was prepared by dissolving the acid into methanol then adding NaOH pellets in excess. An aqueous solution containing 10% by weight sodium hydroxide was used as the catholyte.

The electrolysis was conducted in batch mode, during which the anolyte and catholyte were cycled through the corresponding anode and cathode compartments of the cell. The cell was operated until enough charge passed to theoretically convert 80% of the sodium salt. During the electrolysis the temperatures of the electrolytes were maintained at 50° C., and a current density of 18.5 mA/cm$^2$ was employed.

The reactions that occurred during the electrolysis in the anode and cathode compartment are shown below:

$$C(OH)H_2CH_2CO_2Na \rightarrow C(OH)H_2CH._2 + CO_2 + Na^+ + e^-$$

$$H_2O + e^- \rightarrow H_2 + OH^-$$

$$2C(OH)H_2CH._2 \rightarrow C(OH)H_2CH_2CH_2C(OH)H_2$$

Figure 3:
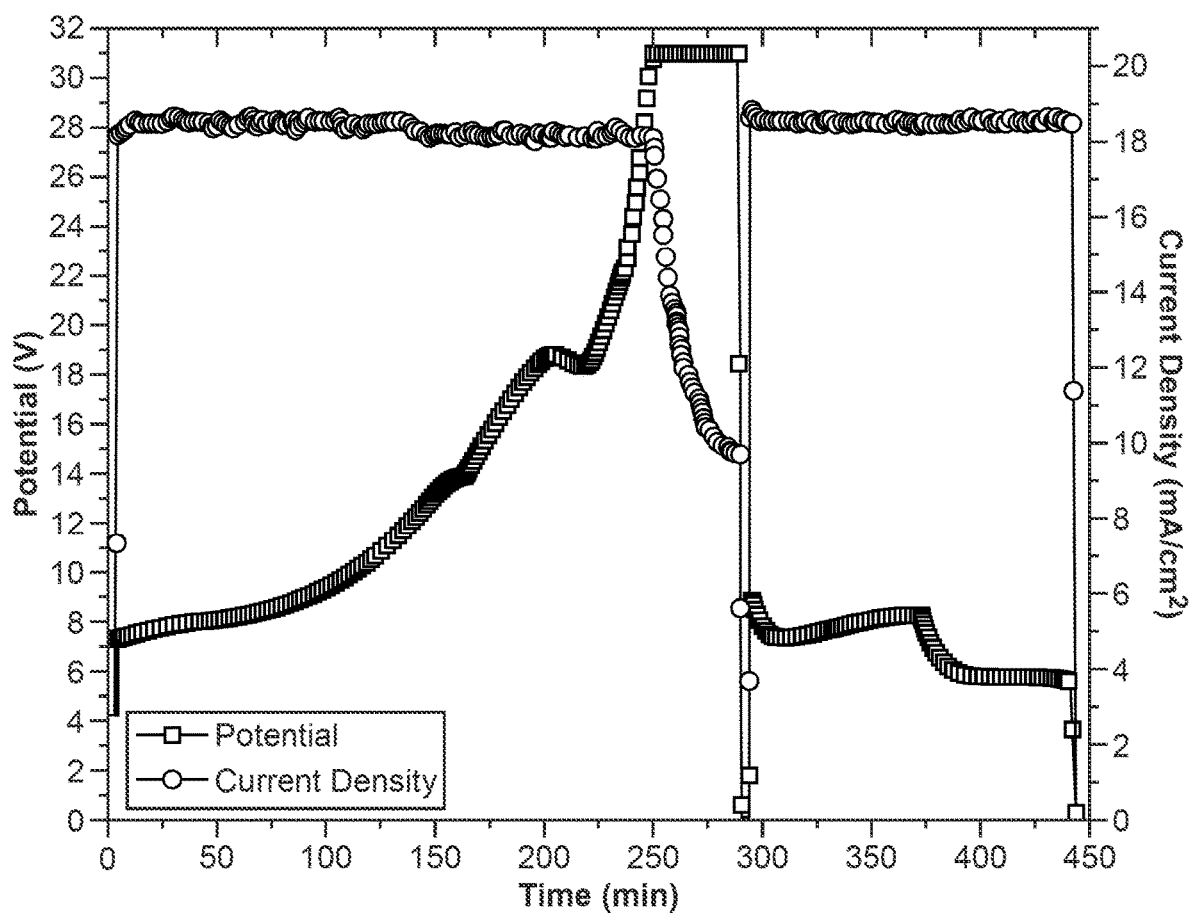
FIG. 3 is a plot of the potential and current density of an electrochemical decarboxylation of sodium 3-hydroxypropionate.

The decarboxylation occurring in the anode compartment produced $CO_2$ which was bubbled through a calcium hydroxide solution forming calcium carbonate which was then analyzed using TGA. FIG. 3 contains a graph showing the potential and current density transients for the electrolysis. The potential started just below 8 Volts and increased to 31 Volts in 5 hours causing decarboxylation to occur. The potential increased from 7 Volts to 32 Volts in under 5 hours when a current density of 18 mA/cm$^2$ was applied. The conditions used in this example promoted radical-radical coupling and produced 1,4-butanediol according to the following reaction:

$$2C(OH)H_2CH._2 \rightarrow C(OH)H_2CH_2CH_2C(OH)H_2$$

Figure 4:
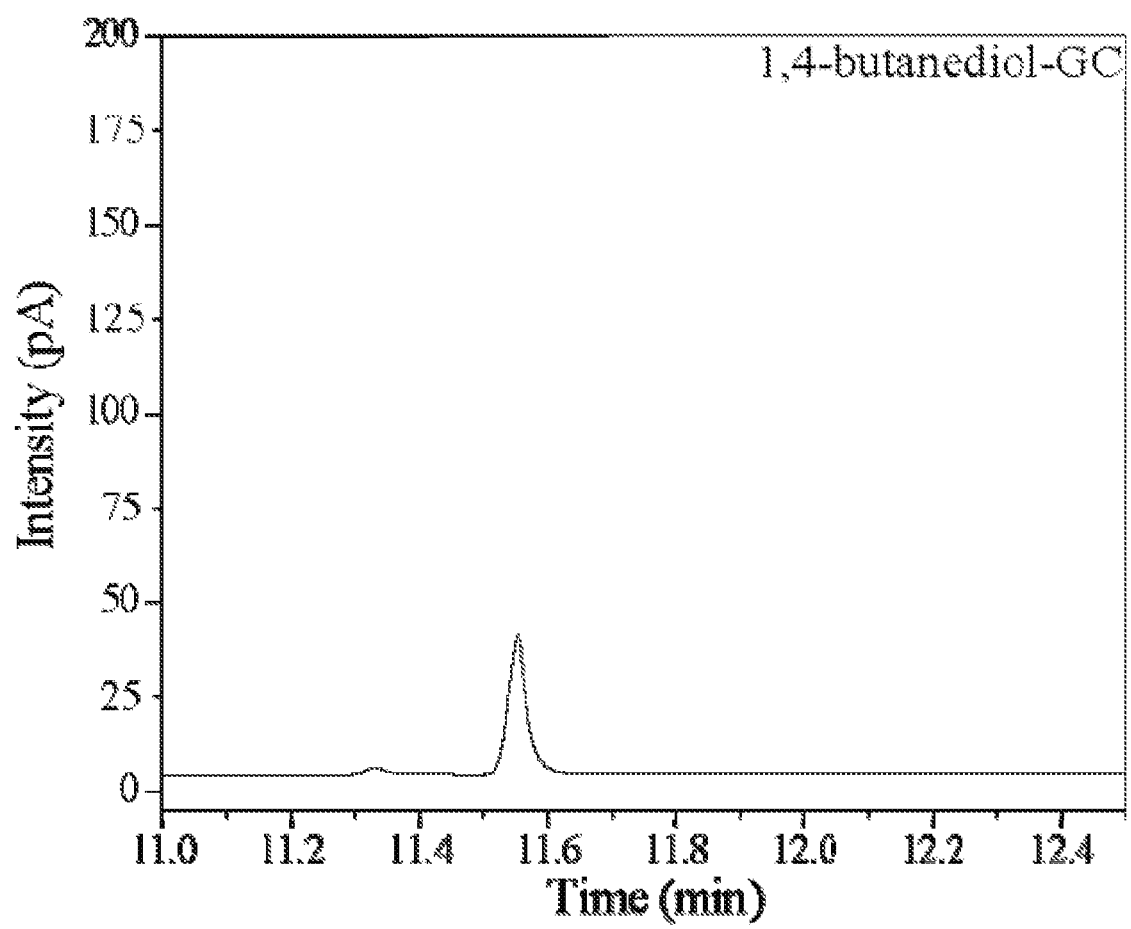
FIG. 4 shows a gas chromatogram of the products obtained from the electrochemical decarboxylation of sodium 3-hydroxypropionate.

Following the completion of the electrolysis, 1-butanol was added at 1% by weight and the anolyte was acidified using sulfuric acid (30%) until a pH of 3 was obtained. The precipitated sodium sulfate was filtered from the anolyte solution and the filtrate was analyzed using GC. Integrating the 1,4-butanediol peak that eluded at 11.57 minutes (or starting at 11.55 min) in FIG. 4, a 80% yield was obtained based on a calibration curve generated using 1-butanol as the internal standard.

The 1,4-butanediol obtained from the electrolysis of sodium 3-hydroxypropoinate has applications as a solvent or can be dehydrated to form 1,3-butadiene. The 1,3-butadiene is an important monomer used in the production of different types of elastic materials.

Example 2

As another example of the present invention, a different carboxylic acid with a hydroxyl group was converted into a compound with multiple oxygen containing functional groups. The compound produced can be used as a food additive or converted into a diol, and then if desired into a diene. The anolyte for this decarboxylation consisted of 10% by weight sodium lactate in methanol, and was prepared by dissolving the acid into methanol then adding NaOH pellets in excess. An aqueous solution containing 10% by weight sodium hydroxide was used as the catholyte.

The electrolysis was conducted in batch mode, during which the anolyte and catholyte were cycled into the corresponding anode and cathode compartments of the cell. The electrolysis was operated until enough charge passed to theoretically convert 80% of the sodium salt. During the electrolysis the temperatures of the electrolytes were maintained at 50° C., and a current density of 9 mA/cm$^2$ was employed.

The reactions that occurred during the electrolysis in the anode and cathode compartment are shown below:

$$CH_3C(OH)HCO_2Na \rightarrow CH_3C(OH)H. + CO_2 + Na^+ + e^-$$

$$H_2O + e^- \rightarrow H_2 + OH^-$$

Figure 5:
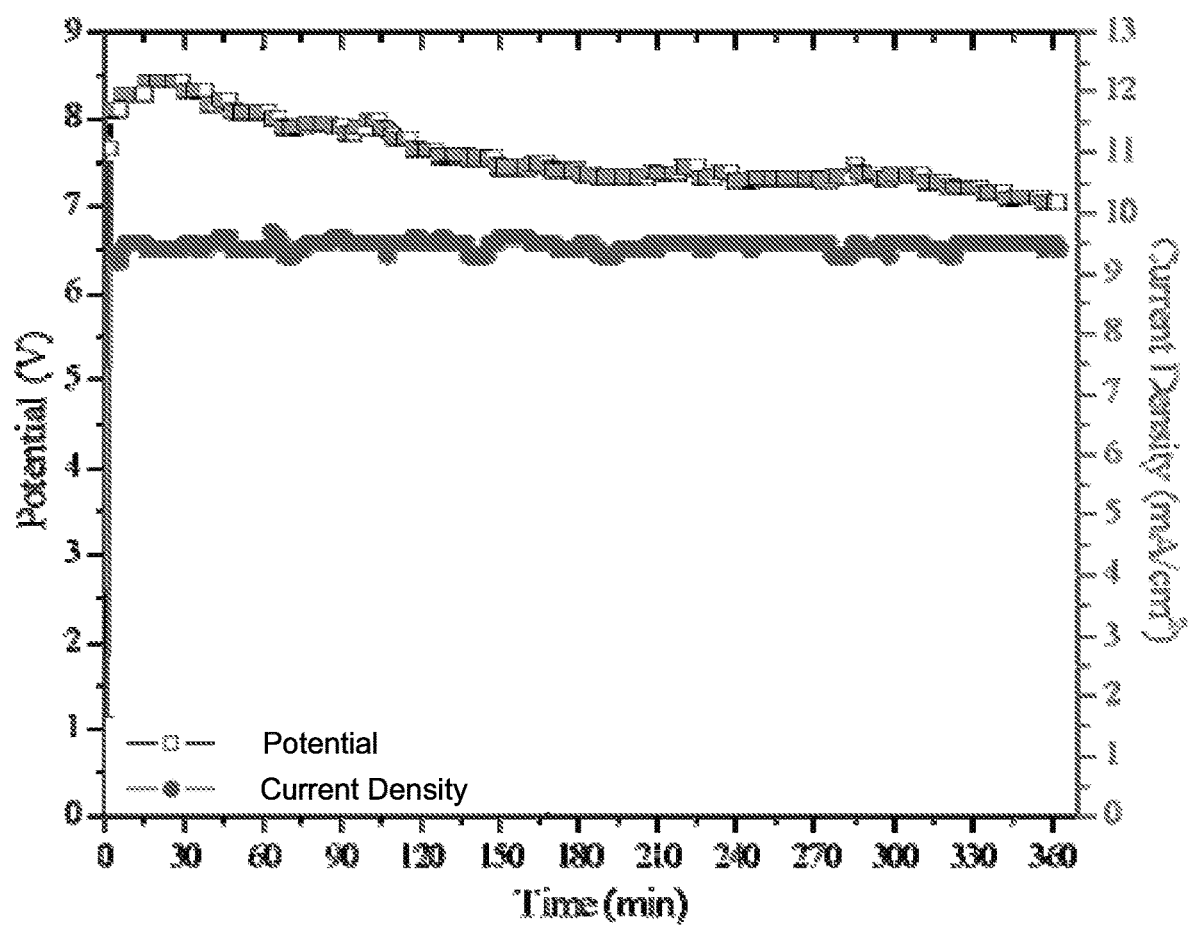
FIG. 5 is a plot of the potential and current density of an electrochemical decarboxylation of sodium L-lactate decarboxylation.

The decarboxylation occurring in the anode compartment produced $CO_2$ which was bubbled through the calcium hydroxide solution forming calcium carbonate which was then analyzed using TGA. FIG. 5 contains a graph showing potential and current transients for the electrolysis. The potential started just below 8 Volts and increased to 31 Volts in 5 hours causing decarboxylation to occur. The potential decreased from 8 Volts to 7 Volts in 6 hours when a current density of 9.5 mA/cm$^2$ was applied. The conditions and the alpha-position of the hydroxyl group in the lactate anion promoted the two electron oxidation and produced acetaldehyde following the non-limiting reaction:

$$H_3C(OH)H. \rightarrow CH_3C(OH)H^+ + e^- + OH^- \rightarrow CH_2C(OH)H$$

The presence of excess NaOH in the solution and the solution temperature of 50° C., further converts the acetaldehyde after the electrolysis is completed following the nucleophilic addition illustrated in the non-limiting reaction:

$$2CH_3CHO + NaOH \rightarrow CH_3COC(OH)HCH_3 + NaOH$$

Figure 6:
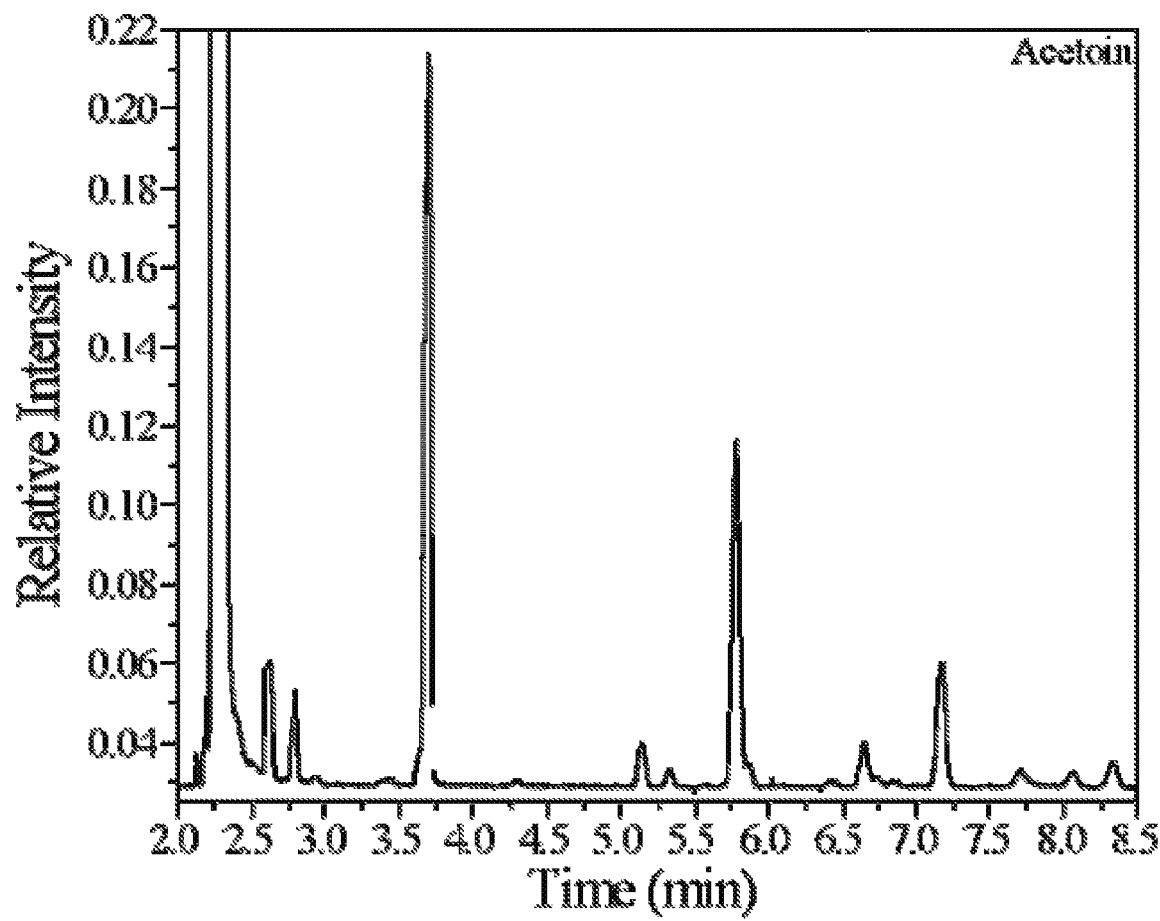
FIG. 6 shows a gas chromatogram of the products obtained from the electrochemical decarboxylation of sodium L-lactate in methanol.

As the above-reaction proceeds, the clear anolyte solution becomes light to dark yellow which is indicative to the formation of acetoin. The solution was then acidified using sulfuric acid and added to equal volume of glycerol. The glycerol based solution was then distilled permitting the different fractions to be collected at the corresponding boiling points and leaving any remaining salts in the glycerol. The GC analysis of the distillate shown in FIG. 6 shows acetion eluded at 3.8 min with 80% yield, and the isomers of 2,3-butanediol eluded at 6.5 and 7.1 min with a 5% yield.

The acetoin produced from the decarboxylation reaction above can be used as a food additive or electrochemically reduced to afford 2,3-butanediol. This diol can then be used as a solvent or be dehydrated to 1,3-butadiene which is an important monomer for the polymerization of many industrially produced rubbers.

Example 3

An example of another embodiment of the present invention will be given, where the same carboxylic acid used in EXAMPLE 2 will be converted directly into a diol. The diol produced can be used as a solvent or it can be further converted into a diene. The anolyte for this example consisted of 20% by weight solution of sodium L-lactate in methanol, and was prepared by dissolving sodium L-lactate (98%, Sigma) directly into methanol. An aqueous solution containing 10% by weight sodium hydroxide was used as the catholyte.

The electrolysis was conducted in batch mode, during which the anolyte and catholyte were cycled into the corresponding anode and cathode compartments of the cell. The electrolysis was continued until enough charge passed to theoretically convert 80% of the sodium salt. During the electrolysis the temperatures of the electrolytes were maintained at 50° C., and a current density of 18 mA/cm$^2$ was employed.

The reactions that occurred during the electrolysis in the anode and cathode compartment are shown in the following reactions:

$$CH_3C(OH)HCO_2Na \rightarrow CH_2C(OH)H. + CO_2 + Na^+ + e^-$$

$$H_2O + e^- \rightarrow H_2 + OH^-$$

The decarboxylation occurring in the anode compartment produced $CO_2$ which was bubbled through the calcium hydroxide solution forming calcium carbonate which was then analyzed using TGA. Under these conditions the radicals generated undergo homocoupling, forming 2,3-butanediol according to the following reaction:

$$2CH_3C(OH)H. \rightarrow CH_3C(OH)HC(OH)HCH_3$$

Figure 7:
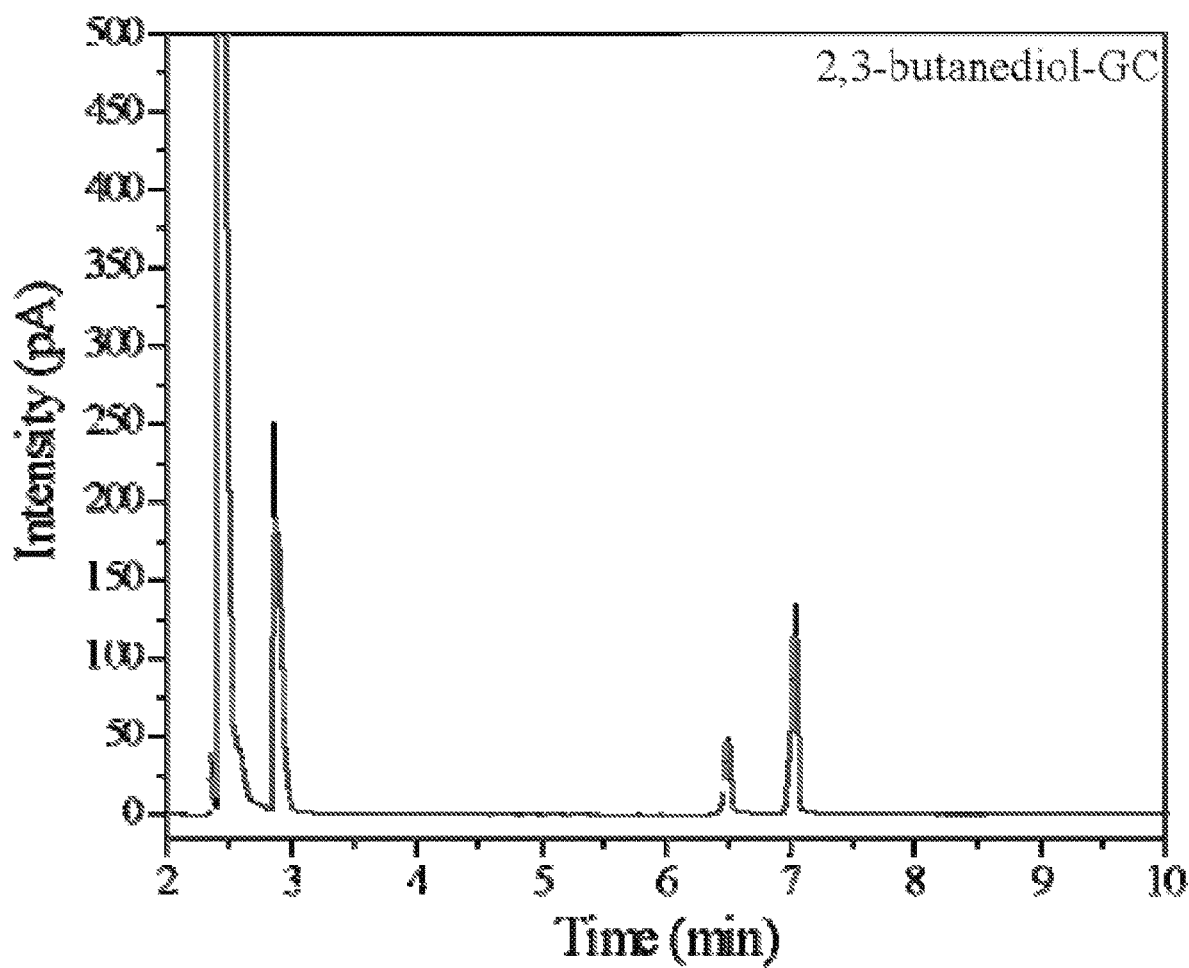
FIG. 7 shows another gas chromatogram of the products obtained from the electrochemical decarboxylation of sodium L-lactate in methanol.

Following the completion of the electrolysis, 1-butanol was added at 1% by weight and the anolyte was acidified using sulfuric acid (30%) until a pH of 3 was obtained. The precipitated sodium sulfate was filtered from the anolyte solution and the filtrate was analyzed using GC. Two peaks corresponding to the three isomers of 2,3-butanediol were eluded as shown in FIG. 7, and integration of these peaks demonstrated that 20% yield was obtained based on a calibration curve generated using 1-butanol as the internal standard. Two peaks are present from the elution of the three isomers of 2,3-butanediol at 6.5 and 7.1 min.

The 2,3-butanediol obtained from the electrolysis of sodium L-lactate has applications as a solvent or can be dehydrated to form 1,3-butadiene. The 1,3-butadiene has an application as a monomer used in the production of different types of elastic materials.

Example 4

An example of another embodiment of the present invention will be given, where the same carboxylic acid used in EXAMPLE 2 and EXAMPLE 3 will be converted directly into a diol using a different solvent. The anolyte for this decarboxylation consisted of 20% by weight solution of sodium L-lactate in ethyl lactate, and was prepared by dissolving sodium L-lactate (98%, Sigma) directly into ethyl lactate. An aqueous catholyte containing 10% by weight sodium hydroxide was used as the catholyte.

The electrolysis was conducted in batch mode, during which the anolyte and catholyte were cycled into the corresponding anode and cathode compartments of the cell. The electrolysis was continued until enough charge passed to theoretically convert 80% of the sodium salt. During the electrolysis the temperatures of the electrolytes were maintained at 50° C., and a current density of 9 mA/cm$^2$ was employed.

The reactions that occurred during the electrolysis in the anode and cathode compartment are shown below.

$$CH_3C(OH)HCO_2Na \rightarrow CH_2C(OH)H. + CO_2 + Na^+ + e^-$$

$$H_2O + e^- \rightarrow H_2 + OH^-$$

Figure 8:
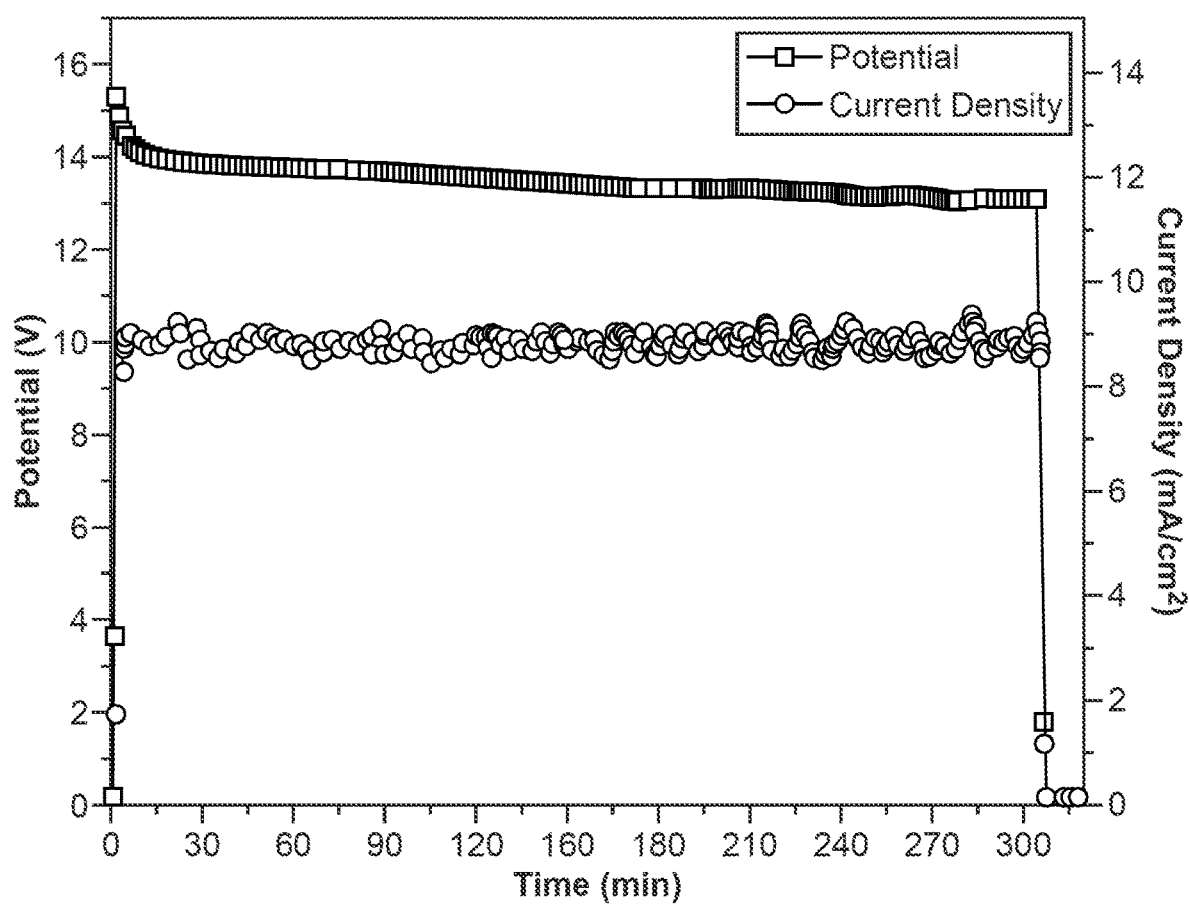
FIG. 8 is a plot of the potential and current density of an electrochemical decarboxylation of sodium L-lactate in ethyl lactate.

The decarboxylation occurring in the anode compartment produced $CO_2$ which was bubbled through the calcium hydroxide solution forming calcium carbonate which was then analyzed using TGA. FIG. 8 contains the potential and current density transients of this electrolysis, showing the potential started at 15 Volts and decreased to 13 Volts in 5 hours when a current density of 9.5 mA/cm$^2$ was applied. Under these conditions the radicals produced underwent radical-radical coupling, forming 2,3-butanediol according to the following reaction:

$$2CH_3C(OH)H. \rightarrow CH_3C(OH)HC(OH)HCH_3$$

Figure 9:
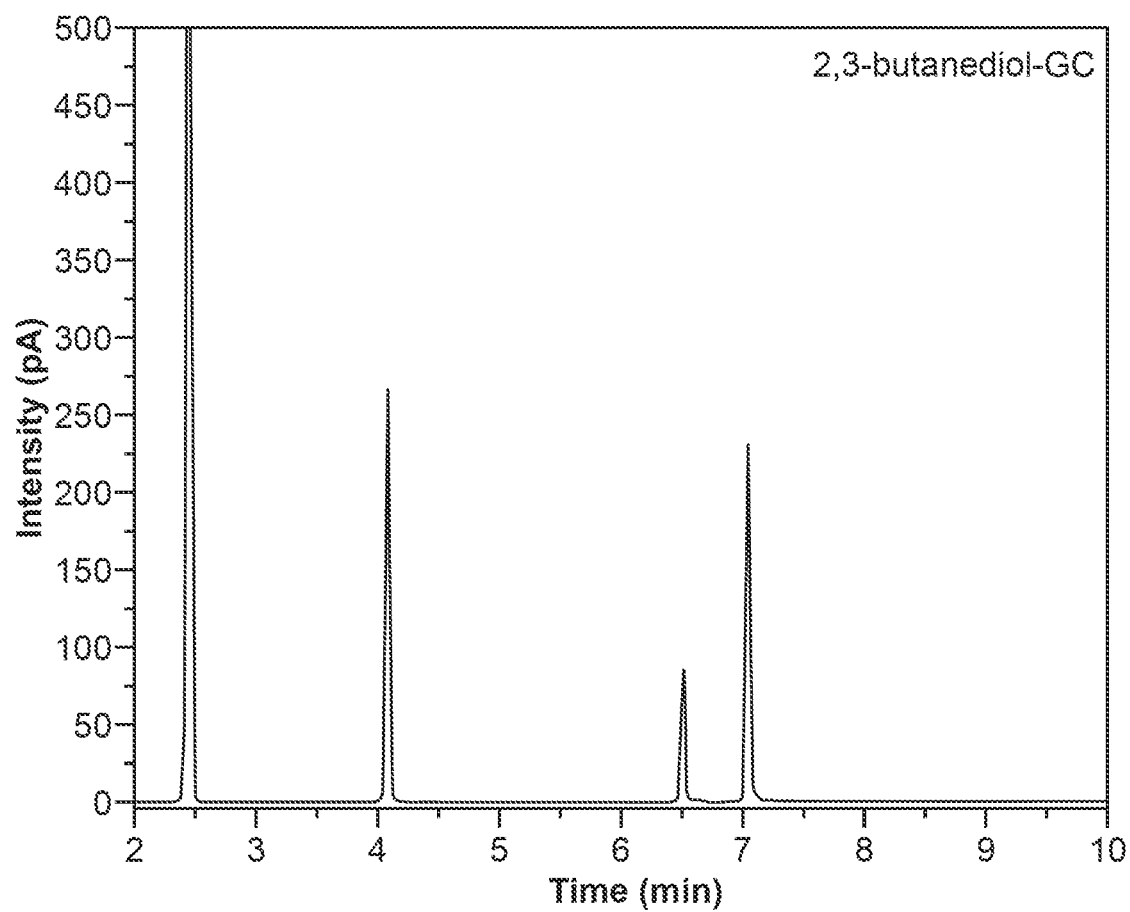
FIG. 9 is a gas chromatogram of the products obtained from the electrochemical decarboxylation of sodium L-lactate in ethyl lactate.

Following the completion of the electrolysis, 1-butanol was added at 1% by weight and the anolyte was acidified using sulfuric acid (30%) until a pH of 3 was obtained. The precipitated sodium sulfate was filtered from the anolyte solution and the filtrate was analyzed using GC. Two peaks corresponding to the three isomers of 2,3-butanediol were eluded on the GC shown in FIG. 9, and integration of these peaks demonstrated that 27% yield was obtained based on a calibration curve generated using 1,butanol as the internal standard. The isomers of the 2,3-butanediol eluded at 6.5 and 7.1 min and the ethyl lactate eluded at 4.1 min.

The 2,3-butanediol obtained from the electrolysis of sodium L-lactate in ethyl lactate has applications as a solvent or can be dehydrated to form 1,3-butadiene. The 1,3-butadiene has an application as a monomer used in the production of different types of elastic materials.

All the patent applications and patents listed herein are expressly incorporated herein by reference.

What is claimed is:

1. An electrochemical cell comprising:
an anolyte compartment comprising an anolyte consisting of at least one alkali metal salt of a carboxylic acid in a molten state;
an anode in contact with the anolyte;
a catholyte compartment comprising a quantity of catholyte;
a cathode in contact with the catholyte;
an alkali ion conductive membrane separating the anolyte and catholyte compartments; and
a voltage source electrically connected to the anode and the cathode, wherein the voltage source decarboxylates the at least one alkali metal salt of the carboxylic acid into alkyl radicals that react to form a coupled radical product.

2. The electrochemical cell of claim 1, wherein the cation of the at least one alkali metal salt of a carboxylic acid is selected from lithium, sodium, potassium and mixtures of the same.

3. The electrochemical cell of claim 1, wherein the carboxylic acid of the at least one alkali metal salt is selected from the group consisting of fatty acids, alkyl carboxylic acids, amino acids, aryl carboxylic acids, and di- and tri-carboxylic acids.

4. The electrochemical cell of claim 1, wherein the alkali ion conducting membrane comprises a thickness of between about 10 and about 5000 microns.

5. The electrochemical cell of claim 4, wherein the alkali ion conducting membrane comprises a thickness of between about 100 and about 1000 microns.

6. The electrochemical cell of claim 5, wherein the alkali ion conducting membrane comprises a thickness of between about 200 and about 700 microns.

7. The electrochemical cell of claim 1, wherein the alkali ion conductive membrane comprises a planar configuration.

8. The electrochemical cell of claim 1, wherein the alkali ion conductive membrane comprises a cylindrical configuration.

9. The electrochemical cell of claim 1, wherein the alkali ion conductive membrane is a NaSICON or LiSICON membrane.

10. The electrochemical cell of claim 9, wherein the catholyte comprises an alkali metal hydroxide or an alkali metal alkoxide or a mixture thereof.

11. The electrochemical cell of claim 10, wherein the catholyte further comprises a solvent.

12. The electrochemical cell of claim 11, wherein the solvent is water or methanol.

13. The electrochemical cell of claim 3, wherein the cation of the at least one alkali metal salt of a carboxylic acid is selected from lithium, sodium, potassium and mixtures of the same.

14. The electrochemical cell of claim 13, wherein the alkali ion conductive membrane is a NaSICON or LiSICON membrane.

15. The electrochemical cell of claim 14, wherein the catholyte comprises an alkali metal hydroxide or an alkali metal alkoxide or a mixture thereof.

16. The electrochemical cell of claim 15, further comprising a solvent selected from the group consisting of water and methanol.

* * * * *